(12) United States Patent
Barbato et al.

(10) Patent No.: US 11,886,845 B1
(45) Date of Patent: Jan. 30, 2024

(54) COMPUTER DASHBOARD EDITING TOOL

(71) Applicant: Splunk Inc., San Francisco, CA (US)

(72) Inventors: Anthony Barbato, Atlanta, GA (US); Patrick Gill, Missoula, MT (US); Nitu Shukla, Redwood City, CA (US); Patrick Wied, San Francisco, CA (US); Tara Yuen, Vancouver (CA)

(73) Assignee: Splunk, Inc., San Francisco, CA (US)

( * ) Notice: Subject to any disclaimer, the term of this patent is extended or adjusted under 35 U.S.C. 154(b) by 0 days.

(21) Appl. No.: 17/877,687

(22) Filed: Jul. 29, 2022

(51) Int. Cl.
*G06F 8/38* (2018.01)

(52) U.S. Cl.
CPC ..................... *G06F 8/38* (2013.01)

(58) Field of Classification Search
CPC ........................................................ G06F 8/38
See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,127,258 B2 | 11/2018 | Lamas et al. | |
| 2009/0024944 A1* | 1/2009 | Louch | G06F 3/04842 715/764 |
| 2010/0057646 A1* | 3/2010 | Martin | G16H 15/00 706/11 |
| 2014/0208215 A1* | 7/2014 | Deshpande | G06Q 30/00 715/736 |
| 2015/0113451 A1* | 4/2015 | Kopp | G06F 16/242 715/764 |
| 2015/0153918 A1* | 6/2015 | Chen | G06Q 10/0639 715/771 |
| 2016/0103889 A1* | 4/2016 | Fletcher | G06F 16/903 707/722 |

(Continued)

OTHER PUBLICATIONS

Splunk Enterprise 8.0.0 Overview, available online, retrieved May 20, 2020 from docs.splunk.com (17 pages).

(Continued)

*Primary Examiner* — Asher D Kells
(74) *Attorney, Agent, or Firm* — Ferguson Braswell Fraser Kubasta PC

(57) ABSTRACT

Dashboard evaluation includes receiving a dashboard code defining a dashboard that includes visualizations in a layout, rendering, in a graphical user interface (GUI) of a dashboard editing tool, the dashboard based on the dashboard code, and extracting, using the dashboard code, a data attribute of a data object represented by a visualization of the multiple visualizations. Dashboard evaluation further includes evaluating, by the dashboard editing tool, the visualization based on the data attribute to obtain a score, presenting, in the GUI of the dashboard editing tool, a recommendation based on the score failing to satisfy a first threshold, receiving, through the GUI of the dashboard editing tool and after presenting the recommendation, an edit to the dashboard code that adjusts the visualization, and storing, by the dashboard editing tool, the edit to the dashboard code.

20 Claims, 16 Drawing Sheets
(4 of 16 Drawing Sheet(s) Filed in Color)

(56) References Cited

U.S. PATENT DOCUMENTS

| | | | |
|---|---|---|---|
| 2018/0165847 A1* | 6/2018 | Broadbent | G06Q 10/0637 |
| 2019/0098106 A1 | 3/2019 | Mungel et al. | |
| 2019/0220153 A1* | 7/2019 | Kidron | G06F 16/9535 |
| 2020/0250472 A1* | 8/2020 | Abhyankar | G06T 11/206 |
| 2021/0042589 A1* | 2/2021 | Tokarev Sela | G06F 16/904 |
| 2021/0224328 A1* | 7/2021 | Schrupp | G06F 16/9038 |
| 2021/0271709 A1* | 9/2021 | Kazem | G06F 40/30 |
| 2021/0365480 A1* | 11/2021 | Kazem | G06Q 10/06393 |
| 2022/0147205 A1* | 5/2022 | Koste | G06F 9/451 |
| 2022/0147540 A1* | 5/2022 | Rossi | G06F 3/0482 |
| 2022/0261139 A1* | 8/2022 | Phoutchanthavongsa | G06F 9/451 |
| 2023/0244675 A1* | 8/2023 | Pandey | G06F 16/24578 707/734 |

OTHER PUBLICATIONS

Splunk Cloud 8.0.2004 User Manual, available online, retrieved May 20, 2020 from docs.splunk.com (66 pages).
Splunk Quick Reference Guide, updated 2019, available online at https://www.splunk.com/pdfs/solution-guides/splunk-quick-reference-guide.pdf, retrieved May 20, 2020 (6 pages).
Carasso, David, "Exploring Splunk" published by CITO Research, New York, NY, Apr. 2012 (156 pages).
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010 (9 pages).

* cited by examiner

COMPUTER DASHBOARD EDITING TOOL

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Computer systems pervade almost every aspect of business and technology. One of the abilities of computer systems is to quickly analyze large volumes of data and present, in a user interface, the data. A goal of the user interface is to accurately present important data in a manner that a user viewing the interface can easily understand the information presented. One method of presenting information is in the form of a dashboard. A dashboard is a collection of visualizations and menu options that allows end users to understand a set of performance metrics. Dashboards may present data that is regularly updated. Thus, with a useful dashboard, users can identify trends and gain insights into systems being monitored.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative examples are described in detail below with reference to the following figures.

DETAILED DESCRIPTION

Graphical user interfaces (GUI) provide a graphical way for an end user to communicate with a computer system. One type of GUI is a dashboard. Dashboards provide a mechanism to present large volumes of data in a simplistic manner. A dashboard is a collection of visualizations, where each visualization shows underlying data objects in a graphical or chart form. When correctly defined, a dashboard, through the visualizations, provide insights to an end user viewing the dashboard. However, if incorrectly defined, the dashboard and visualizations can obfuscate the underlying data and cause confusion to the end user. For example, presenting multiple visualizations of the same type in a single row, where each visualization is a complicated graph may cause an end user to be confused.

An interface system for dashboard editing tool automatically evaluates and provides recommendations for a dashboard. A dashboard is a collection of visualizations of underlying data objects. The interface system receives the visualization and evaluates the visualization along various evaluation categories. For each evaluation category, the interface system applies scoring rules based on data attributes of data objects represented by the visualization to obtain a score. Based on the score, the interface system presents a recommendation to edit the dashboard, which may be implemented. By providing a mechanism to automatically evaluate a dashboard based on underlying data, the interface system may improve the resulting dashboard including the visualizations presented in the dashboard.

Figure 1:
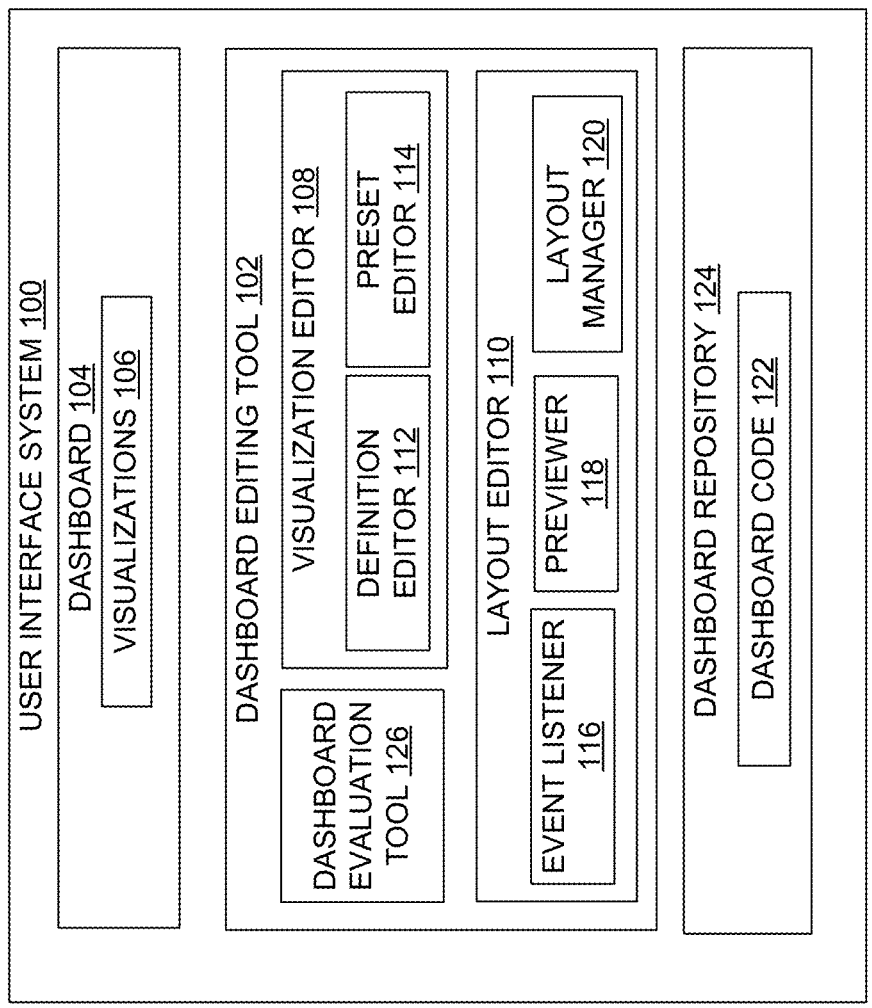
FIG. 1 illustrates an example block diagram of a user interface system for dashboard editing.

FIG. 1 illustrates an example block diagram of a user interface system 100 for dashboard viewing and editing. The user interface system 100 includes a production environment whereby end users may view a dashboard 104. An end user is a user that views the dashboard in the production interface environment. An end user may optionally also be a user that modifies the dashboard 104.

A dashboard 104 is a GUI with a collection of visualizations 106 displayed in a single view. Through the visualizations 106, the dashboard 104 organizes underlying data (e.g., from one or more data sources, analytics tools of the data intake and query system (described in reference to FIG. 13), and/or the data stores) into a single interface for display the end user. The dashboard 104 may include multiple views. A view is a set of visualizations that are displayed concurrently in a single window of the dashboard 104. The dashboard in the production environment interface only displays a single view in a window concurrently. For example, a view may be defined for different groups of target systems being monitored, or for different classifications of data.

The visualizations 106 may be various forms of charts (e.g., histogram charts, graphs, donut charts, circle charts, timelines, etc.), lists, tables, and other discrete forms of visual information communication, that provide information to a user. In some embodiments, each visualization is discrete from other visualizations. Specifically, although the visualization may be related to other visualizations, the information communicated in the visualization is independent of the location of the visualization within the dashboard. Through the dashboard, users may identify relationships between metrics, identify trends, and determine when problems or issues may exist.

In the production environment, the dashboard 104 is not modifiable with respect to the layout or visualizations in at least some embodiments. In the production environment, the dashboard 104 is populated using data. For example, the dashboard 104 may be continually updated as data is received. The particular data is defined by data objects specified by the dashboard. Specifically, the data objects define the data from events that are used to populate the visualizations in the dashboard.

The dashboard 104 is defined by dashboard code 122 in a dashboard repository 124. A dashboard repository 124 is a storage repository, such as a file system, memory, or other storage for dashboard code 122. Dashboard code 122 is computer readable code defining the dashboard 104 to be rendered. For example, the dashboard code 122 defines the layout of the dashboard (e.g., the location of the headers and the visualizations), content and type of each visualization, color schemes, font types, and font sizes and other aspects of the dashboard.

Dashboard editing allows for customizable dashboards by allowing users to define dashboard code 122. For example, a user, such as an information technology specialist, monitoring a system may want to create a customized dashboard 104 based on business and monitoring needs. The user interface system 100 provides a technique to receive predefined or partially defined dashboard code and analyze the dashboard code 122.

The user interface system 100 also includes a dashboard editing tool 102. In the dashboard editing tool 102, rather than the user individually editing each portion of a dashboard or writing all of the dashboard code for the dashboard, the dashboard editing tool 102 provides an interface with dragging and dropping functionality. Through the dashboard editing tool 102, users may drag and drop particular types of visualizations onto the dashboard. The dashboard editing tool 102 sizes the new visualization for the drop zone location and resizes the neighboring visualizations.

The dashboard editing tool 102 is a GUI and underlying software for creating an updated dashboard 104. Creation may be a generation of a new dashboard or a generation of an updated dashboard from an existing dashboard. The dashboard editing tool 102 includes a visualization editor 108, a layout editor 110, and a dashboard evaluation tool 126.

The visualization editor 108 is an editor for updating individual visualizations. The visualization editor 108 includes a GUI and interpretation software for building a visualization.

A visualization may be specified by a definition, preset data, and a visualization type code in the dashboard code 122. The visualization type code is a set of computer instruction code for rendering a visualization of a particular visualization type. Specifically, the visualization type code is configured to receive, as input, parameters of a visualization and output a rendering of the visualization. The parameters may include, for example, the colors and/or color scheme, size, data, and any other parameters of the visualization. The output of the visualization type code is a rendered visualization. The visualization type code is code that specifies how to place the location of lines, shapes, and characters in a visualization of a particular visualization type when provided with a set of input parameters having the data for the visualization. The visualization type is the particular type of chart, list, or other type. The visualization type code may further include instructions for generating a legend for the visualization. For example, a donut chart visualization type has a different visualization type code than any of a table visualization type, circle visualization type, histogram visualization type, or other visualization type.

The definition defines the visualization type, dataset to use for the visualization, style, font color values and a color encoding for the dataset in the visualization, one or more location identifiers within a cell for displayed components of the visualization (e.g., location of text in the visualization), text to display, whether to include legends and labels to add, and other displayed parameters of the visualization. In one or more embodiments, the definition is defined in JSON or extensible markup language (XML) format.

The preset data links the definition and the visualization type code. The preset data references the visualization type code for a particular visualization and translates the components of the definition into input parameters for the visualization type code. In one or more embodiments, the preset data is dependent on the visualization type specified in the definition. An independent preset data may exist for each visualization type included in the definition.

Continuing with the visualization editor 108, the visualization editor 108 includes a definition editor 112 and a preset editor 114. In one or more embodiments, the definition editor 112 is a user interface for the user to edit the definition. The preset editor 114 is a user interface for the user to update the preset data. The editor 102 may further include an interpreter. The interpreter is computer readable program code that parses the definition and the preset data, to extract information and passes the extracted information to the visualization type code to render the visualization.

The layout editor 110 includes functionality to modify the layout of the dashboard 104 based on user input. The layout editor 110 is a tool that assists a user in updating a dashboard. For example, the layout editor is configured to propagate changes and automatically size and resize visualizations without input from the user. The result of the layout editor 110 is a simplified interface that provides drag and drop functionality while creating a professional quality dashboard. Upon input to add, move, or remove a visualization, the layout editor 110 algorithmically adjusts the layout to avoid or mitigate for null space (i.e., where no visualization is present), performs automatic alignment, and maintains sizing requirements of visualizations. Thus, one or more embodiments are directed to an improved and simplified user interface by which a dashboard is customized.

The layout editor 110 includes an event listener 116, a previewer 118, and a layout manager 120. The event listener 116 is configured to wait for and handle various user events. User events can include click events, dragging events, and other types of user events. User events may be for a selected visualization and/or an edge. The selected visualization is a visualization that is selected to be added, moved, or removed. The user event for an edge may be an edge dragging event.

The previewer 118 is a graphical user interface configured to present a preview of the dashboard. A previewer 118 is a view of the dashboard prior to being put in the production environment interface 100. In one or more embodiments, prior to receiving a selection to accept a drop zone location for a selected visualization, the previewer 118 may present a placeholder for a selected visualization in the user interface. A placeholder is a general representation of the visualization that is the same size and shape as the visualization if placed at the drop zone location. The placeholder may be a fuzzy version of the visualization that is a solid shape in which the visualization would appear, or another type of shape.

The layout manager 120 is a software tool that automatically propagates adjustments to the layout to the remainder portions of the dashboard. For example, the layout manager 120 includes functionality to automatically resize, move, and edit neighboring visualizations based on user input of a selected visualization. The layout manager 120 is further configured to transmit updates of the dashboard to the previewer.

The dashboard evaluation tool 126 is configured to evaluate the dashboard, including the preview of the dashboard, through several evaluation categories, score the dashboard, and make recommendations to modify the dashboard. The dashboard evaluation tool 126 may be associated with a GUI widget, such as a drop-down menu or a selectable button that may be selected to trigger the evaluation.

Figure 2:
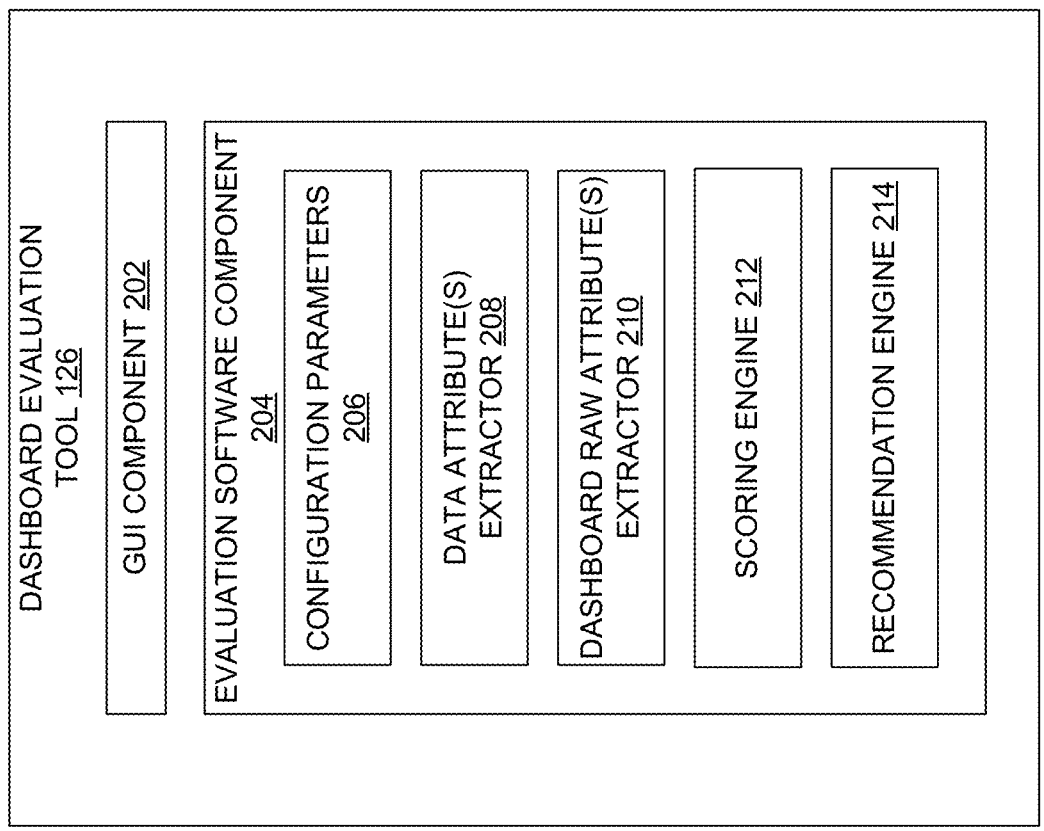
FIG. 2 illustrates an example block diagram of a dashboard evaluation tool for dashboard editing.

FIG. 2 illustrates an example block diagram of a dashboard evaluation tool 126 for dashboard editing. As shown in FIG. 2, the dashboard evaluation tool 126 includes both a GUI component 202 and evaluation software component 204. The GUI component 202 is an overlay on the preview that presents the score and the recommendations. The GUI component 202 may include indicators indicating which visualizations or properties fail to satisfy respective thresholds. The indicators may be callouts overlaid onto the preview that displays the recommendation. The GUI component 202 may also include an overlay that shows a simulated preview (e.g., as the dashboard would appear to a person with protanopia, to a person viewing the dashboard in a small display, or to other vision challenges). The GUI component 202 may include a side panel that displays indicators as recommendations. The side panel is a panel displayed next to the dashboard preview.

A recommendation is a suggestion to improve the dashboard. The recommendation may specify the result of applying a corresponding rule. The recommendation may also include a selectable suggestion for modifying the dashboard. The selectable suggestion is a specific suggestion for making a modification. The selectable suggestion is a proposed modification to the dashboard or a visualization of the dashboard. The dashboard evaluation tool 126 also includes an accept button and an ignore button. Upon selection of the accept button displayed with the selectable suggestion, the proposed modification is automatically performed. Upon selection of the ignore button, the proposed modification is not performed. The dashboard evaluation tool 126 also includes a suggestion preview that shows the dashboard with the suggestion implemented.

The evaluation software component 204 is software configured to evaluate the dashboard. The evaluation software component 204 includes configuration parameters 206, data attribute(s) extractor 208, dashboard raw attribute(s) extractor 210, scoring engine 212, and recommendation engine 214.

The configuration parameters 206 are parameters that define how the dashboard evaluation tool 126 operates. For example, the configuration parameters 206 may specify the display of the recommendations (e.g., the side panel and/or callouts), one or more thresholds to apply for each property to trigger one or more recommendations, and the evaluation categories of properties of the dashboard.

Data attribute(s) extractor 208 includes functionality to extract attribute values of attributes of the underlying data objects being presented in the visualization. As discussed above, the underlying data objects define the data obtained from events. Specifically, the data objects specify which fields are extracted from events. The data objects may also specify processing that is performed on the one or more fields to create the data that is used to populate the fields. For example, the processing may include a conditional on a value extracted from one field that involves evaluating values from another field of the same event with a particular function to obtain the data that is populated into a visualization. As another example, the data object may specify a function on values extracted from a single field to obtain the data. As another example, the data object may specify a function that combines two or more values extracted from two or more fields.

The data attributes are attributes of the data defined by the object. For example, the data attributes may specify the data type of the data, the distribution of the data, the range of the data, and other data attributes. The data attribute(s) extractor 208 includes functionality to use the data objects and obtain a sample of values from matching events in the sample. The data attribute extractor 208 further includes functionality to apply functions as specified by the data objects to obtain a data sample. The data attribute(s) extractor 208 further includes functionality to perform data analytics on the data sample to obtain data attributes. The data attributes are data properties of the dashboard.

The dashboard raw attributes extractor 210 includes functionality to extract dashboard raw attributes. The dashboard raw attributes are attributes of the dashboard or the visualization that are directly obtained from the dashboard or particular visualization. By themselves, raw attributes do not reflect the quality of the dashboard/visualization. For example, the raw attributes may be the dimensions and location of a visualizations of the dashboard (e.g., in a row). As another example, the dashboard raw attributes may be the background color value of the dashboard, font size, color value, and type of text on the dashboard and individual visualizations, the color values used in each visualization, the mapping of color values to underlying data, and locations of selectable user interface elements. The dashboard raw attributes extractor 210 extracts the attributes from the preview, and from the dashboard code.

The scoring engine 210 is configured to apply scoring rules to the dashboard raw attributes and the data attributes to obtain scores for individual visualizations and for the dashboard as a whole. The scoring engine 210 may include functionality to determine property values of properties of the dashboard (including visualization(s)). Properties are attributes related to the quality of the dashboard or visualization that are calculated from or include the dashboard raw attributes and the data attributes. For example, the properties may include the color contrast ratio, size differences of fonts and visualizations, the relationship of data objects as represented in different visualizations, the number of visualizations in a row or column, and other properties.

The recommendation engine 214 is configured to apply configuration parameters 206 to the scores generated by the scoring engine 212 and generate one or more recommendations based on the scores. The recommendation engine 212 may further include functionality to output the recommendations to the GUI component.

The scoring engine 210 and recommendation engine 214 operate on along multiple evaluation categories. An evaluation category is a category by which the dashboard and individual visualizations are evaluated.

Figure 3:
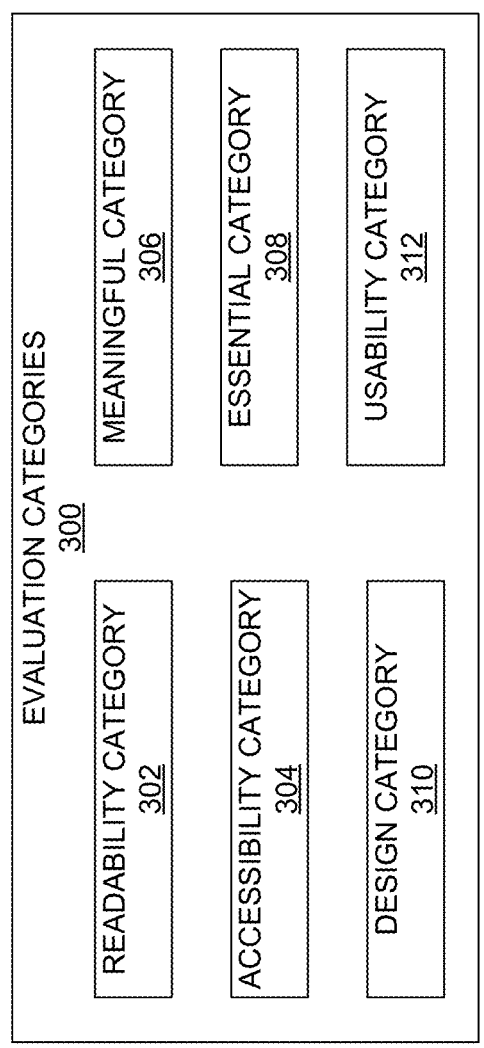
FIG. 3 illustrates an example diagram of evaluation categories.

FIG. 3 illustrates an example diagram of the collection of evaluation categories 300. As shown in FIG. 3, the evaluation categories 300 include a readability category 302, an accessibility category 304, a meaningful category 306, an essential category 308, a design category 310, and a usability category 312.

Applying the readability category 302, the user interface system executes scoring rules that analyzes the dashboard and independent visualizations to determine whether the dashboard and independent visualizations are readable. For example, the rules in the readability category 302 are directed to font sizes being less than a font size threshold, a calculated color contrast ratio between color values in a visualization being less than a color contrast ratio threshold, and the density of information (e.g., density within a visualization of data, density of visualizations on the dashboard), and other aspects of the dashboard that affect readability.

Applying the accessibility category 304, the user interface system applies scoring rules that analyzes the dashboard from the standpoint of various users. For example, the accessibility has scoring rules that consider users with color blindness and other vision difficulties. For example, the scoring rules may determine whether transforming the dashboard to greyscale would result in the contrast between data of different data objects being less than a threshold. The scoring rules may also consider whether the navigation tools within the dashboard are easily identifiable and selectable. For example, a user with a hand tremor may have difficulty selecting to expand portions of a visualization that are less than a threshold size (e.g., too small).

Applying the meaningful category 306, the user interface system executes scoring rules that analyzes the dashboard and visualization to determine whether an end user's questions can be answered. The meaningful category analyzes visualizations based on visualization type and size. For example, the meaningful category considers the type of data being displayed based on the data objects to determine whether more meaningful data may be displayed by further processing the data. For example, if a pie chart is crowded, the meaningful category may recommend further grouping in the pie chart by adding selectable elements to drill down into individual groups. The meaningful category may also consider the data type of data. For example, if the data type is time series data for a pie chart visualization, the meaningful category may recommend changing the visualization to a time series graph. The meaningful category may also consider color schemes used in visualizations. For example, the meaningful category may recommend reversing color schemes used if color values in the red range are used for data objects that are positive and green color schemes used for anomalies.

Applying the essential category 308, the user interface system executes scoring rules that analyzes the dashboard to determine whether the more important information in the visualizations is more prominent and the less important information is less prominent. The scoring rules may have a ranking of fields of events that provide data to the data objects to determine the prominence. The scoring rules may also have a ranking of data objects. The scoring rules may also have rules that use the amount of data presented in a visualization and the amount of processing in the visualization. Thus, visualizations with data objects having more processing and presenting less data are before visualizations that have more information. The goal of such rules is to make summary visualizations more prominent in the dashboard. Namely, the goal of the essential category is to prioritize and highlight the most important information and make sure that the information that is highlighted is considered essential.

Applying the design category 310, the user interface system executes scoring rules that consider the overall design of the dashboard and whether the dashboard is visually appealing. For example, the design category 310 may apply a scoring rule that determines whether the number of different font types that the user is applying to determine whether the number of different font types is greater than a threshold. The design category 310 may also consider whether the font types and color scheme are visually appealing. The rules in the design category 310 may be based on whether the collection of color values matches one or more color schemes.

Applying the usability category 312, the user interface system executes scoring rules that analyzes the dashboard and visualizations across multiple platforms. The usability category considers whether users in as many platforms as possible can absorb the visualization. The platforms consider both the device type, the operating system, and the method to access the dashboard.

Figure 4:
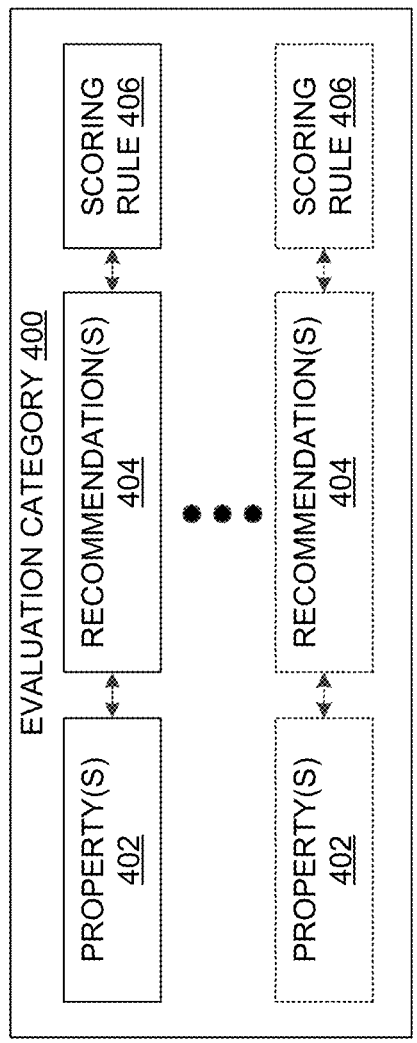
FIG. 4 illustrates an example diagram of a category.

FIG. 4 illustrates an example diagram of an evaluation category. Specifically, FIG. 4 is an expansion of each of the evaluation categories shown in FIG. 3. The evaluation categories may each have the components shown in FIG. 4.

As shown in FIG. 4, for various property(s) 402 of the dashboard and visualization, the evaluation category includes one or more scoring rules 406 and one or more recommendation(s) 404. A scoring rule 406 is a specific rule that takes, as input, one or more property values of one or more properties 402, and produces, as output, a score. A scoring rule 406 is a function on the property 402. The function may be a mapping function, an equation, or another type of function. The score represents the degree to which the property value(s) satisfy the scoring rule 406. Thus, the scoring defines the degree to which the property value(s) indicate the dashboard complies with the goal of the evaluation category 400. Each score is associated with a corresponding threshold. A recommendation(s) 404 is associated with the corresponding threshold. The recommendation is a human readable suggestion to improve the dashboard and one or more visualizations based on the evaluation category. The recommendation(s) 404 may also include one or more selectable suggestions for modifying the dashboard or visualization. For example, the recommendation may include a mapping between properties and selectable suggestions.

Figure 5:
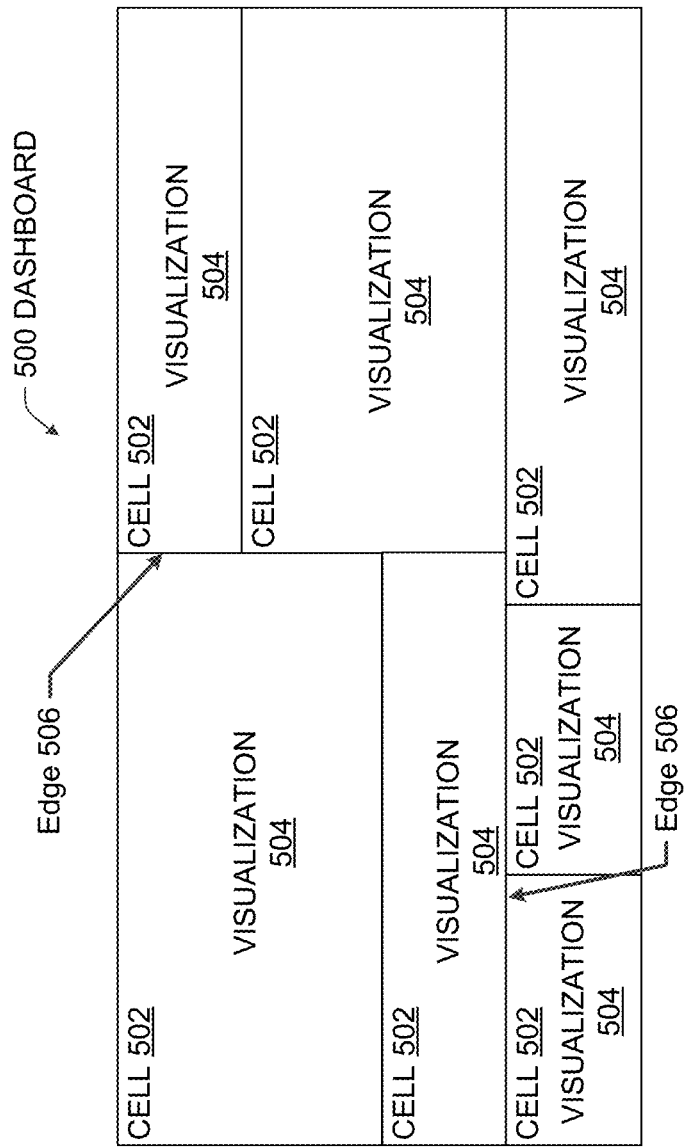
FIG. 5 illustrates an example diagram of a dashboard.

FIG. 5 illustrates an example schematic diagram of a dashboard 500, in accordance with example embodiments. As shown in FIG. 5A, the dashboard includes multiple cells 502 in a single view. In one or more embodiments, a one to one correspondence between cells 502 and visualizations 504 exists. A cell 502 is a discrete, dynamically changing location that holds a visualization 504. The visualization 504 is the graphics and text inside of the cell 502. The cell may be a bounding box for the visualization. For example, the cell may be a rectangular shape that just fits the visualization. Thus, the graphics and text for a visualization 504 may span the size of the cell 502. In some embodiments, the cell is any shape. The cell 502 is dynamic in that a cell may be resized, removed, partitioned to create a new cell, and dynamically added as updates to the layout are performed.

The cell 502 includes edges 506. Edges 506 are the boundary on a side of a cell 502. For example, an edge may be a boundary between neighboring cells. In embodiments in which the cell is rectangular, the cell has four edges.

Edges may be set as hidden or visible in the production environment interface. Visible edges have a border overlaid on the edge. Whereas an edge is a boundary, the border is a visual indicator of the edge 506 that is displayed to an end user. In one or more embodiments, borders are generated at runtime and when a visualization is loaded. Namely, borders are not saved with the dashboard code.

Although not shown, the dashboard may include additional components. The additional components may include titles, menu options, view selectors, and other graphical options that allow the end user to specify the data presented in the dashboard.

Figure 6:
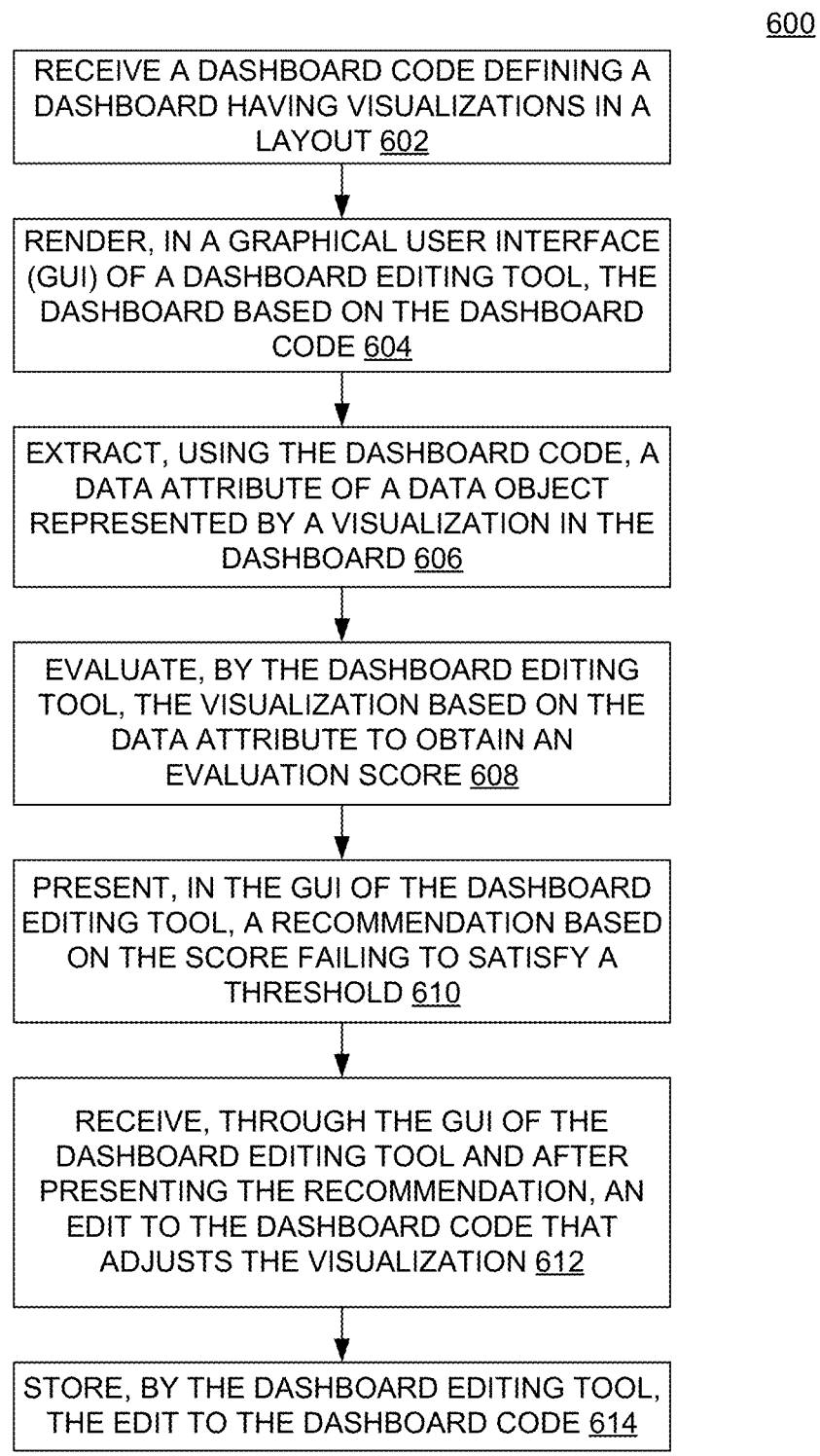
FIG. 6 illustrates an example flowchart for editing a dashboard.
Figure 7:
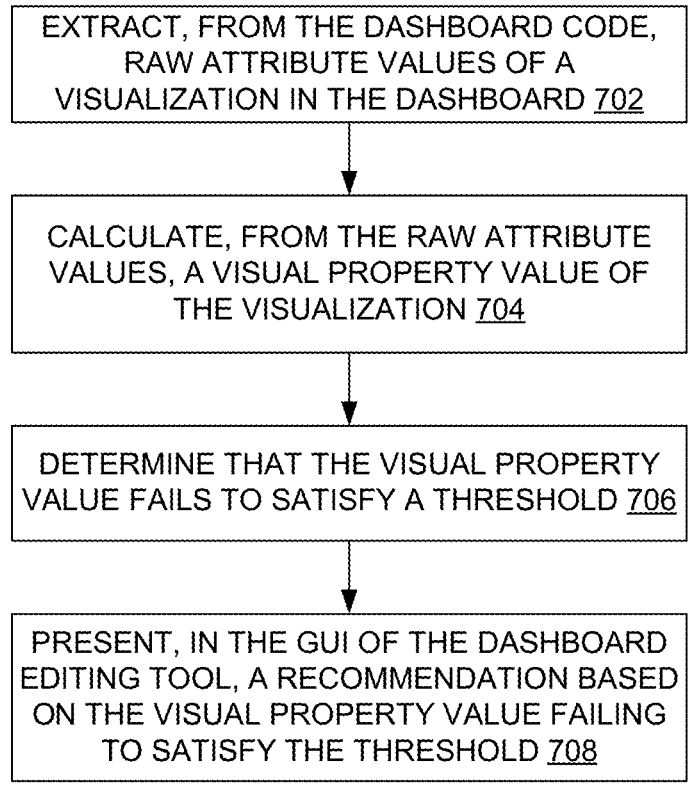
FIG. 7 illustrates an example flowchart for evaluating the dashboard during editing.
Figure 8:
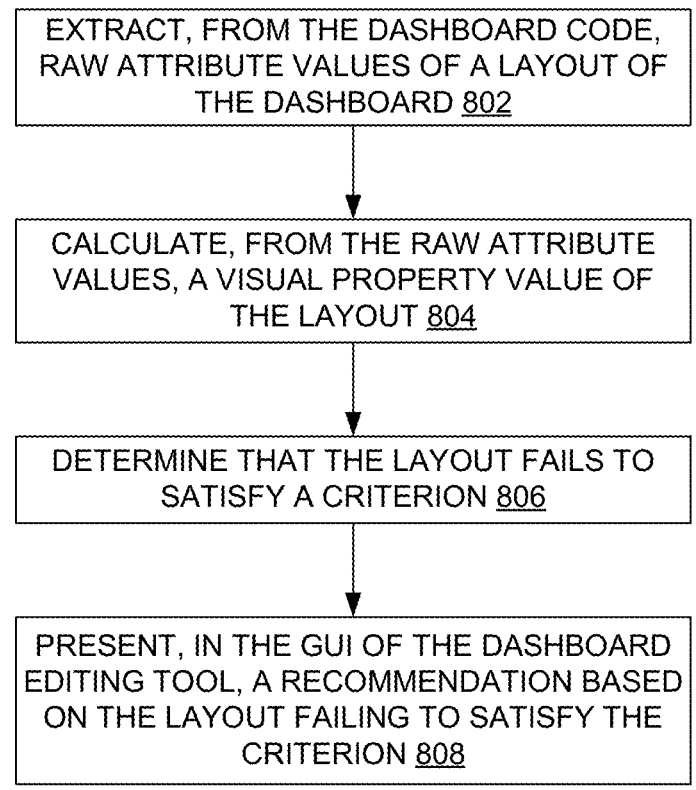
FIG. 8 illustrates an example flowchart for presenting recommendations during dashboard editing.

FIGS. 6-8 are flowcharts illustrating an example process. The example processes can be implemented, for example, by a computing device that comprises a processor and a non-transitory computer-readable medium. The non-transitory computer readable medium can be storing instructions that, when executed by the processor, can cause the processor to perform the operations of the illustrated processes. Alternatively, or additionally, the processes can be implemented using a non-transitory computer-readable medium storing instructions that, when executed by one or more processors, cause the one or more processors to perform the operations of the processes of FIGS. 6-8.

FIG. 6 illustrates an example flowchart for editing a dashboard. In Block 602, dashboard code defining a dashboard is received. The dashboard code may be received through the user uploading the dashboard code to the dashboard editing tool. As another example, the dashboard code may be received by the user creating the dashboard using the dashboard editing tool.

In Block 604, in the GUI of the dashboard editing tool, the dashboard is rendered based on the dashboard code. Rendering the dashboard includes obtaining sample values of fields. The individual visualization is generated from the sample values according to the dashboard code. For example, in the data intake and query system described in FIGS. 13-16, a query defined in the dashboard code for the visualization is executed. Executing the query includes querying the data intake and query system for a data sample of the data object. Then, the visualization is generated from the data sample. The visualizations are combined into the dashboard.

In Block 606, using the dashboard code, a data attribute of a data object represented by a visualization in the dashboard is extracted. For each data object, the data type of the data sample is determined. Further, statistics may be performed on the data to determine the distribution and the range. Other data attributes may be determined from the data.

In Block 608, the dashboard editing tool evaluates the visualization based on the data attributes to obtain a score. The data attribute is a property that is used as input to the scoring rule. The scoring rule executes the function to obtain the score.

In Bock 610, in the GUI of the dashboard editing tool, a recommendation is presented based on the score failing to satisfy a threshold. The score that is generated for the property is compared against a corresponding configuration threshold. If the score fails to satisfy the threshold, then the recommendation is displayed in the dashboard editing tool. The recommendation may be transmitted to the display to the user via the user interface. Regardless of whether the score satisfies the threshold, the user interface system evaluates the dashboard and visualizations on the next property.

In Block 612, through the GUI of the dashboard editing tool and after presenting the recommendation, an edit to the dashboard code that adjusts the visualization is received. The user may select the selectable suggestion to automatically implement the recommendation. For example, selecting the selectable suggestion may cause an increase in font size, a transformation of one visualization type to another visualization type, or a change in color scheme. Other types of selectable suggestion may cause other transformations.

In Block 614, the dashboard editing tool stores the edit to the dashboard code. The user may accept or reject the modification. If the user accepts the modification, the change to the dashboard code is saved in the repository. Once changes are made, the dashboard may be transmitted to the production environment for use by the end users.

FIG. 7 illustrates an example flowchart for evaluating the visual properties during editing. In Block 702, from the dashboard code, raw attribute values of one or more visualizations in the dashboard are extracted. As discussed above, the raw attributes include locations of color values, font size, color values, etc.

In Block 704, from the raw attribute values, a visual property value of the visualization is calculated. The raw attribute values are combined and analyzed to obtain visual property values. The visual property values may include the density of information in each visualization, size of the visualization, the scale used in the visualization, the color contrast ratio between neighboring colors, and values of other properties that are present when the visualization is displayed. For example, from the raw attribute values, a first color value of a first color in a visualization is extracted, and a second color value of a second color used in the visualization is extracted. The color contrast ratio between the first color value and the second color value is performed. The process may be repeated for each set of neighboring colors in the visualization. Further, for color blindness, the first color value and the second color values may be mapped to a first mapped value and a second mapped value. The mapping may be based on what a person with color blindness might see. The mapped color contrast ratio may also be determined.

In Block 706, a determination is made that a visual property value fails to satisfy a threshold. The determination of the visual property value satisfying a threshold may be performed similar to Block 608 and 610 of FIG. 6. Specifically, the dashboard editing tool applies the scoring rule to the visual property value to obtain a score and compares the score to a threshold. If the threshold is satisfied, the next scoring rule or next property is compared. Some visual property values may fail to satisfy a threshold. In the above example of the color contrast, the color contrast ratio may be compared to a first threshold and the mapped color contrast may be compared to a second threshold to determine whether either threshold is satisfied.

In Block 708, based on the determination that the visual property value fails to satisfy a threshold, a recommendation is presented in the GUI of the dashboard editing tool. In the color contrast ratio example, the recommendation may be to change the first color value or the second color value. The recommendation may be presented similar to Block 610 and 612 of FIG. 6. The user may select the selectable suggestion in the recommendation to make an edit or the user may manually make the edit to the dashboard code. Responsive to the edit and acceptance thereof, the revised dashboard code is saved.

Although the above presents a color contrast ratio example, the evaluation may be based on the shape of the data object not matching the visualization. For example, from sample data, the shape of the data may be determined. The shape of the data is the way in which the data is displayed. Based on the shape of the data, a recommendation may be to change a visualization attribute (e.g., granularity, scale, etc.). For example, the recommendation may be to change the scale from linear to logarithmic.

FIG. 8 illustrates an example flowchart for evaluating the visual properties of the layout during editing. The layout considers that dashboard as a whole.

In Block 802, from the dashboard code, raw attribute values of the layout in the dashboard are extracted. As discussed above, the raw attributes include locations and types of visualizations, the headers including fonts, background color values, and other information.

In Block 804, from the raw attribute values, a visual property value of the layout is calculated. The raw attribute values are combined and analyzed to obtain visual property values. The visual property values may include the density of visualizations, comparative sizes of different text, the data in each visualization, and other properties that describe the overall layout of the dashboard.

In Block 806, a determination is made that a visual property value fails to satisfy a threshold. The determination of the visual property value satisfying a threshold may be performed similar to Block 608 and 610 of FIG. 6. Specifically, the dashboard editing tool applies the scoring rule to the visual property value to obtain a score and compares the score to a threshold. If the threshold is satisfied, the next scoring rule or next property is compared. Some visual property values may fail to satisfy a threshold.

In Block 808, based on the determination that the visual property value fails to satisfy a threshold, a recommendation is presented in the GUI of the dashboard editing tool. For example, the recommendation may be to move one or more visualizations around, change the headers and subheadings, or perform other operations. The recommendation may be presented similar to Block 610 and 612 of FIG. 6. The user may select the selectable suggestion in the recommendation to make an edit or the user may manually make the edit to the dashboard code. Responsive to the edit and acceptance thereof, the revised dashboard code is saved.

Figure 9:
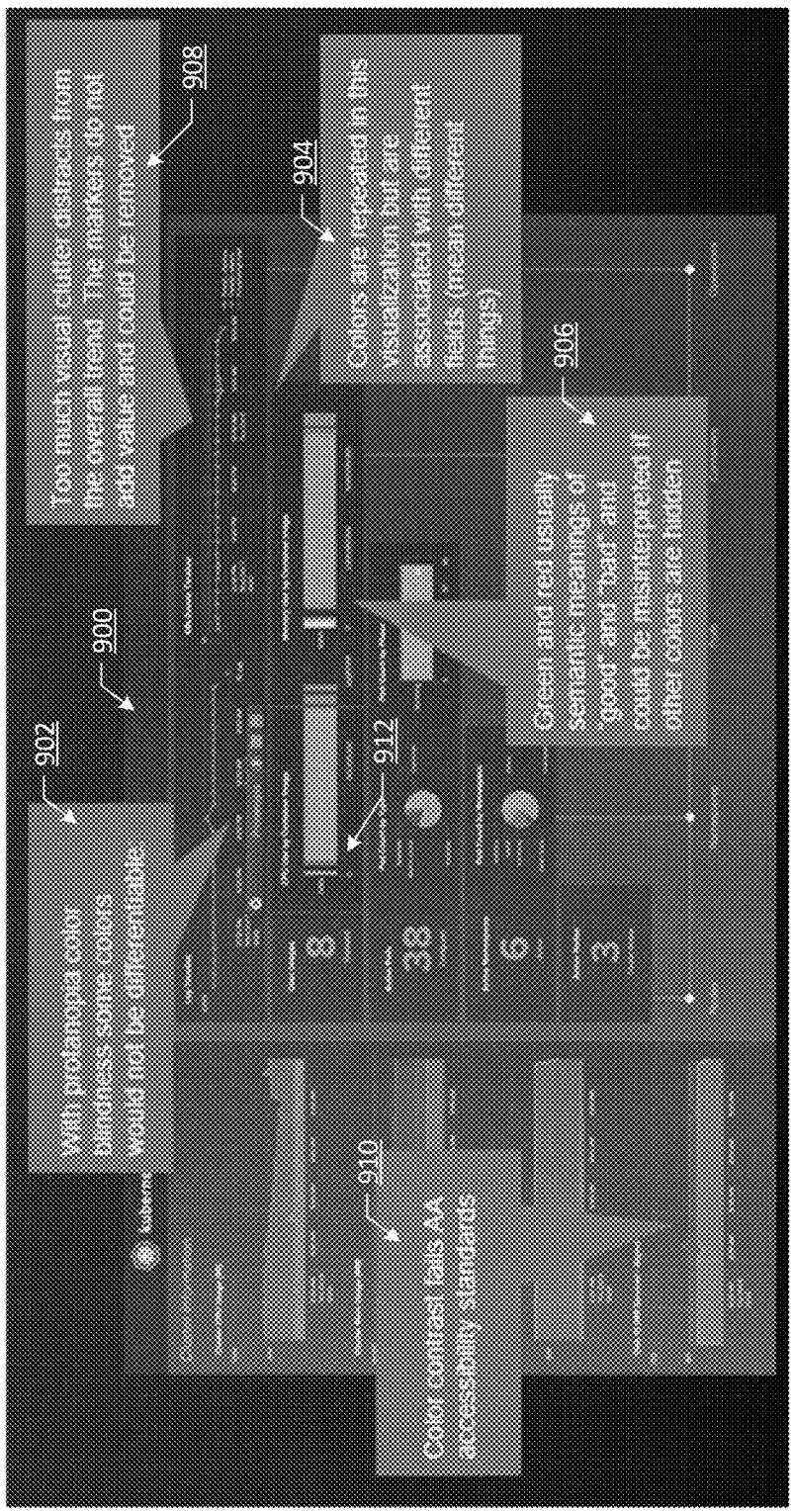
FIG. 9 illustrates an example dashboard.

FIG. 9 illustrates an example dashboard 900 with the callouts 902-910 showing the recommendations. For example, callout 902 explains with a simulated view 912 the visualization if a user with protanopia color blindness were to view the simulation as part of the accessibility category. Callout 910 explains that the color contrast ratio of a visualization does not satisfy accessibility standards as part of the accessibility category. Callout 908 is based on a usability category to indicate that clutter is hard to read. Callout 904 indicates that colors that are repeated should mean the same even if associated with different fields. Callout 906 is also associated with the efficiency category that colors should use the standard meanings.

Figure 10:
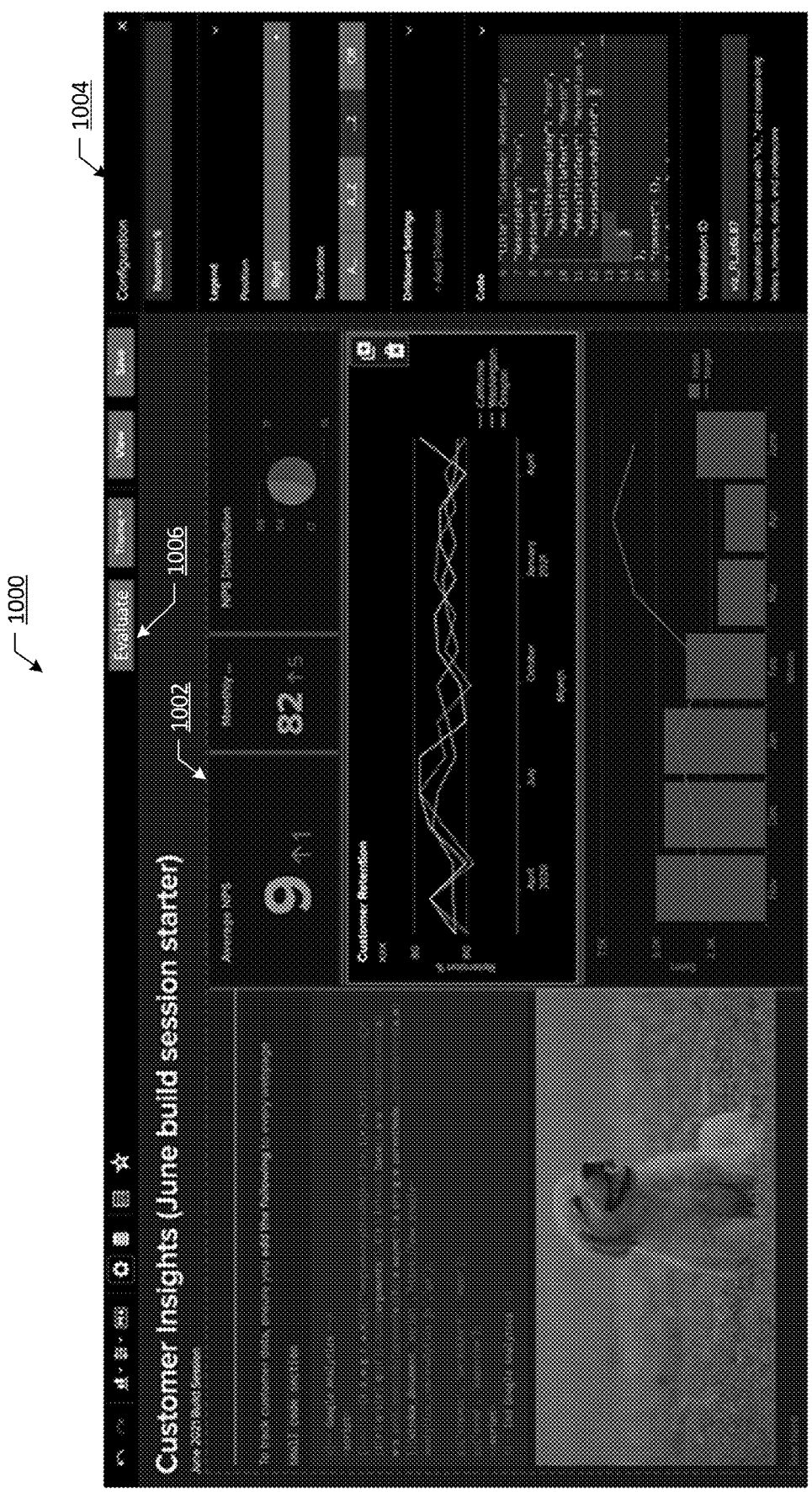
FIG. 10 illustrates a second example dashboard.

FIG. 10 illustrates a second example dashboard within the context of the dashboard editing tool 1000. In FIG. 10, the dashboard editing tool 1000 includes a GUI editor on the left side showing the dashboard 1002 while the right pane shows the dashboard code for the dashboard. The user may edit the left side or the right side to change the interface. The user may also select button 1006 to evaluate the dashboard. Button 1006 is an example of a GUI widget that triggers the evaluation. Upon selection of button 1006, the right pane is changed to show recommendations. Specifically, upon receiving a selection of the GUI widget, the dashboard editing tool triggers the execution of the dashboard evaluation tool. The dashboard evaluation tool evaluates the dashboard along several evaluation categories. The dashboard evaluation tool identifies at least a subset of the visualizations of the dashboard based on the at least the subset failing to satisfy the respective threshold. Namely, properties in each of the subset do not satisfy one or more respective thresholds. Responsive to the subset failing to satisfy the respective threshold, the indicator is presented for each visualization in the subset in the GUI of the dashboard editing tool. Examples are shown in FIGS. 9, 11, and 12 of the indicators that may be presented.

Figure 11:
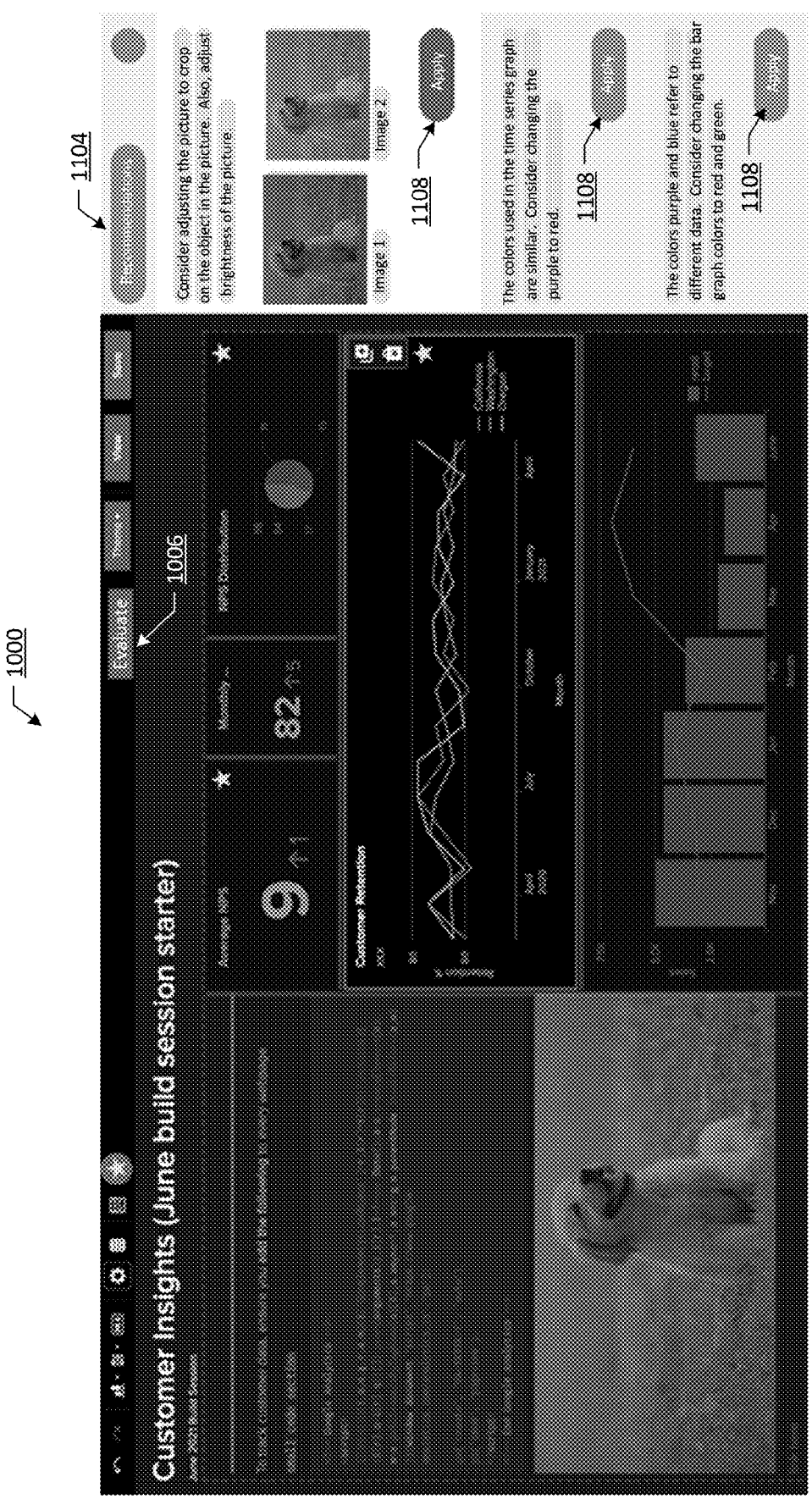
FIG. 11 illustrates the second example dashboard with recommendations.

FIG. 11 illustrates the second example dashboard within the dashboard editing tool 1000 with the recommendations after the evaluate button 1006 is selected. The recommendations are displayed in the right pane 1104 of the dashboard editing tool. The recommendations are selectable suggestions that are each associated with an apply button. When the apply button is selected. The selectable suggestions are implemented.

Figure 12:
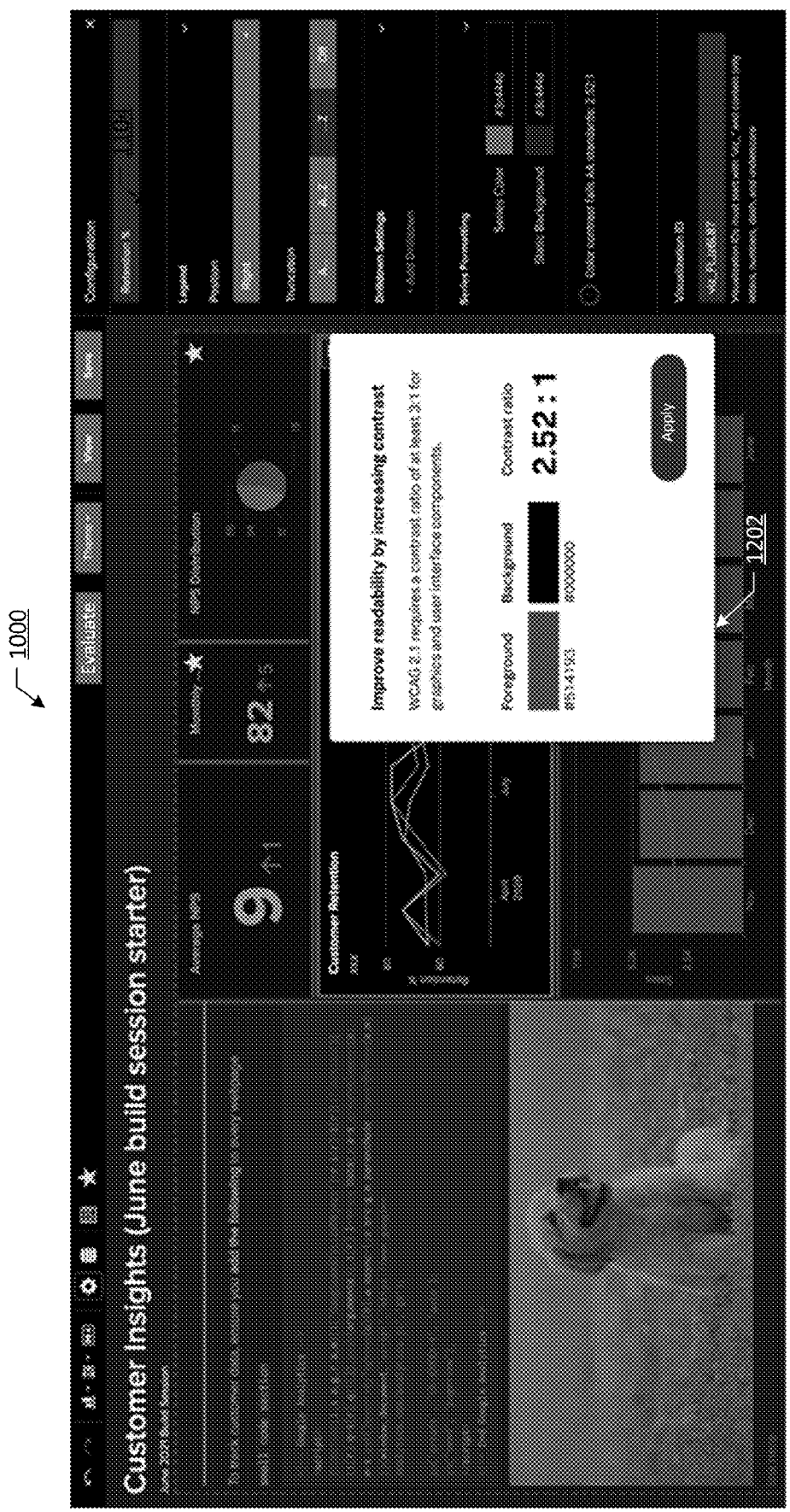
FIG. 12 illustrates the second example dashboard with recommendations.

FIG. 12 illustrates the second example dashboard within the dashboard editing tool 1000 with a recommendation shown in a popup window. In the example dashboard, the popup window 1202 makes a recommendation regarding the dashboard as a whole as compared to a visualization. Namely, the color contrast rule is applied to determine that the color used in a visualization does not have enough of a contrast ratio with the background color. The user may edit the colors in the popup window to see the resulting contrast ratio. When the user is satisfied, the user may select the apply button to have the colors applied to the dashboard.

As shown through the interfaces, the dashboard evaluation tool not only accounts for the visual aspects and also the underlying data. The dashboard evaluation tool considers that dashboard along a variety of evaluation categories to determine the dashboard quality. Further, the dashboard evaluation tool makes specific recommendations to improve the dashboard.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively, or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 13:
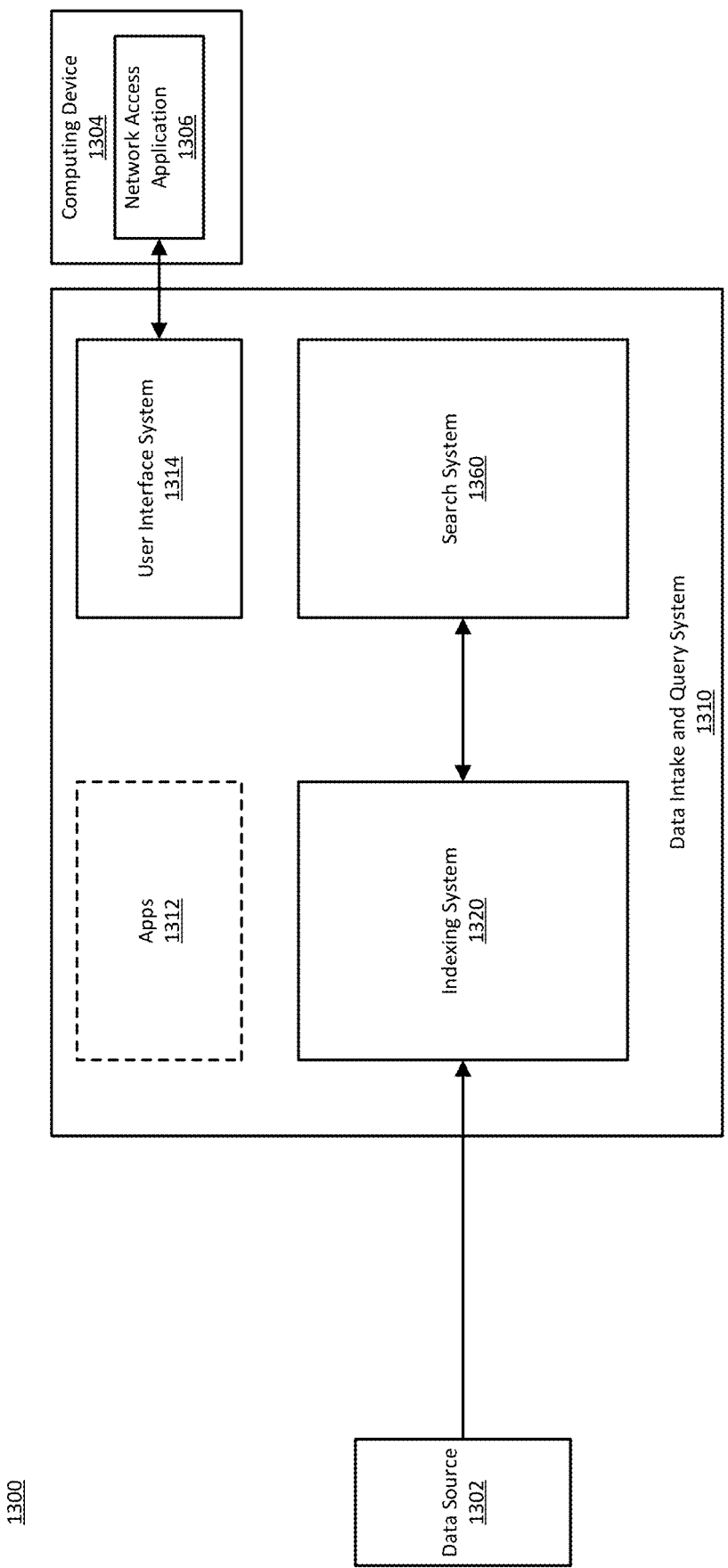
FIG. 13 illustrates an example data intake and query system in which FIG. 1 may be implemented.

FIG. 13 is a block diagram illustrating an example computing environment 1300 that includes a data intake and query system 1310. The data intake and query system 1310 obtains data from a data source 1302 in the computing environment 1300 and ingests the data using an indexing system 1320. A search system 1360 of the data intake and query system 1310 enables users to navigate the indexed data. Though drawn with separate boxes in FIG. 13, in some implementations the indexing system 1320 and the search system 1360 can have overlapping components. A computing device 1304, running a network access application 1306, can communicate with the data intake and query system 1310 through a user interface system 1314 of the data intake and query system 1310. Using the computing device 1304, a user can perform various operations with respect to the data intake and query system 1310, such as administration of the data intake and query system 1310, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 1310 can further optionally include apps 1312 that extend the search, analytics, and/or visualization capabilities of the data intake and query system 1310.

The data intake and query system 1310 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 1310 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 1310 can be executed on a single computing device, or execution of the program code can be distributed over multiple computing devices. For example, the program code can include instructions for both indexing and search components (which may be part of the indexing system 1320 and/or the search system 1360, respectively), which can be executed on a computing device that also provides the data source 1302. As another example, the program code can be executed on one computing device, where execution of the program code provides both indexing and search components, while another copy of the program code executes on a second computing device that provides the data source 1302. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 1302 of the computing environment 1300 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 1302 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 1320 obtains machine date from the data source 1302 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 1320 does not require prior knowledge of the structure of incoming data (e.g., the indexing system 1320 does not need to be provided with a schema describing the data). Additionally, the indexing system 1320 retains a copy of the data as it was received by the indexing system 1320 such that the original data is always available for searching (e.g., no data is discarded, though, in some examples, the indexing system 1320 can be configured to do so).

The search system 1360 searches the data stored by the indexing 1320 system. As discussed in greater detail below, the search system 1360 enables users associated with the computing environment 1300 (and possibly also other users) to navigate the data, generate reports, and visualize search results in "dashboards" output using a graphical interface. Using the facilities of the search system 1360, users can obtain insights about the data, such as retrieving events from an index, calculating metrics, searching for specific conditions within a rolling time window, identifying patterns in the data, and predicting future trends, among other examples. To achieve greater efficiency, the search system 1360 can apply map-reduce methods to parallelize searching of large volumes of data. Additionally, because the original data is available, the search system 1360 can apply a schema to the data at search time. This allows different structures to be applied to the same data, or for the structure to be modified if or when the content of the data changes. Application of a schema at search time may be referred to herein as a late-binding schema technique.

The user interface system 1314 provides mechanisms through which users associated with the computing environment 1300 (and possibly others) can interact with the data intake and query system 1310. These interactions can include configuration, administration, and management of the indexing system 1320, initiation and/or scheduling of queries that are to be processed by the search system 1360, receipt or reporting of search results, and/or visualization of search results. The user interface system 1314 can include, for example, facilities to provide a command line interface or a web-based interface.

Users can access the user interface system 1314 using a computing device 1304 that communicates with data intake and query system 1310, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 1300. For example, a person can log in as a particular user and, using the user's digital information, can access the data intake and query system 1310. A user can be associated with one or more people, meaning that one or more people may be able to use the same user's digital information. For example, an administrative user account may be used by multiple people who have been given access to the administrative user account. Alternatively, or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 1304 can provide a human-machine interface through which a person can have a digital presence in the computing environment 1300 in the form of a user. The computing device 1304 is an electronic device having one or more processors and a memory capable of storing instructions for execution by the one or more processors. The computing device 1304 can further include input/output (I/O) hardware and a network interface. Applications executed by the computing device 1304 can include a network access application 1306, such as a web browser, which can use a network interface of the client computing device 1304 to communicate, over a network, with the user interface system 1314 of the data intake and query system #A110. The user interface system 1314 can use the network access application 1306 to generate user interfaces that enable a user to interact with the data intake and query system #A110. A web browser is one example of a network access application. A shell tool can also be used as a network access application. In some examples, the data intake and query system 1310 is an application executing on the computing device 1306. In such examples, the network access application 1306 can access the user interface system 1314 without going over a network.

The data intake and query system 1310 can optionally include apps 1312. An app of the data intake and query system 1310 is a collection of configurations, knowledge objects (a user-defined entity that enriches the data in the data intake and query system 1310), views, and dashboards that may provide additional functionality, different techniques for searching the data, and/or additional insights into the data. The data intake and query system 1310 can execute multiple applications simultaneously. Example applications include an information technology service intelligence application, which can monitor and analyze the performance and behavior of the computing environment 1300, and an enterprise security application, which can include content and searches to assist security analysts in diagnosing and acting on anomalous or malicious behavior in the computing environment 1300.

Though FIG. 13 illustrates only one data source, in practical implementations, the computing environment 1300 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 1300, the data intake and query system 1310 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud and has digital access to resources provided by the computing devices only to the extent that such access is enabled by the provider entity.

In some implementations, the computing environment 1300 can include on-prem and cloud-based computing resources, or only cloud-based resources. For example, an entity may have on-prem computing devices and a private cloud. In this example, the entity operates the data intake and query system 1310 and can choose to execute the data intake and query system 1310 on an on-prem computing device or in the cloud. In another example, a provider entity operates the data intake and query system 1310 in a public cloud and provides the functionality of the data intake and query system 1310 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 1310. In some implementations, the entity providing the data intake and query system 1310 is itself subscribing to the cloud services of a cloud service provider. As an example, a first entity provides computing resources under a public cloud service model, a second entity subscribes to the cloud services of the first provider entity and uses the cloud computing resources to operate the data intake and query system 1310, and a third entity can subscribe to the services of the second provider entity in order to use the functionality of the data intake and query system 1310. In this example, the data sources are associated with the third entity, users accessing the data intake and query system 1310 are associated with the third entity, and the analytics and insights provided by the data intake and query system 1310 are for purposes of the third entity's operations.

Figure 14:
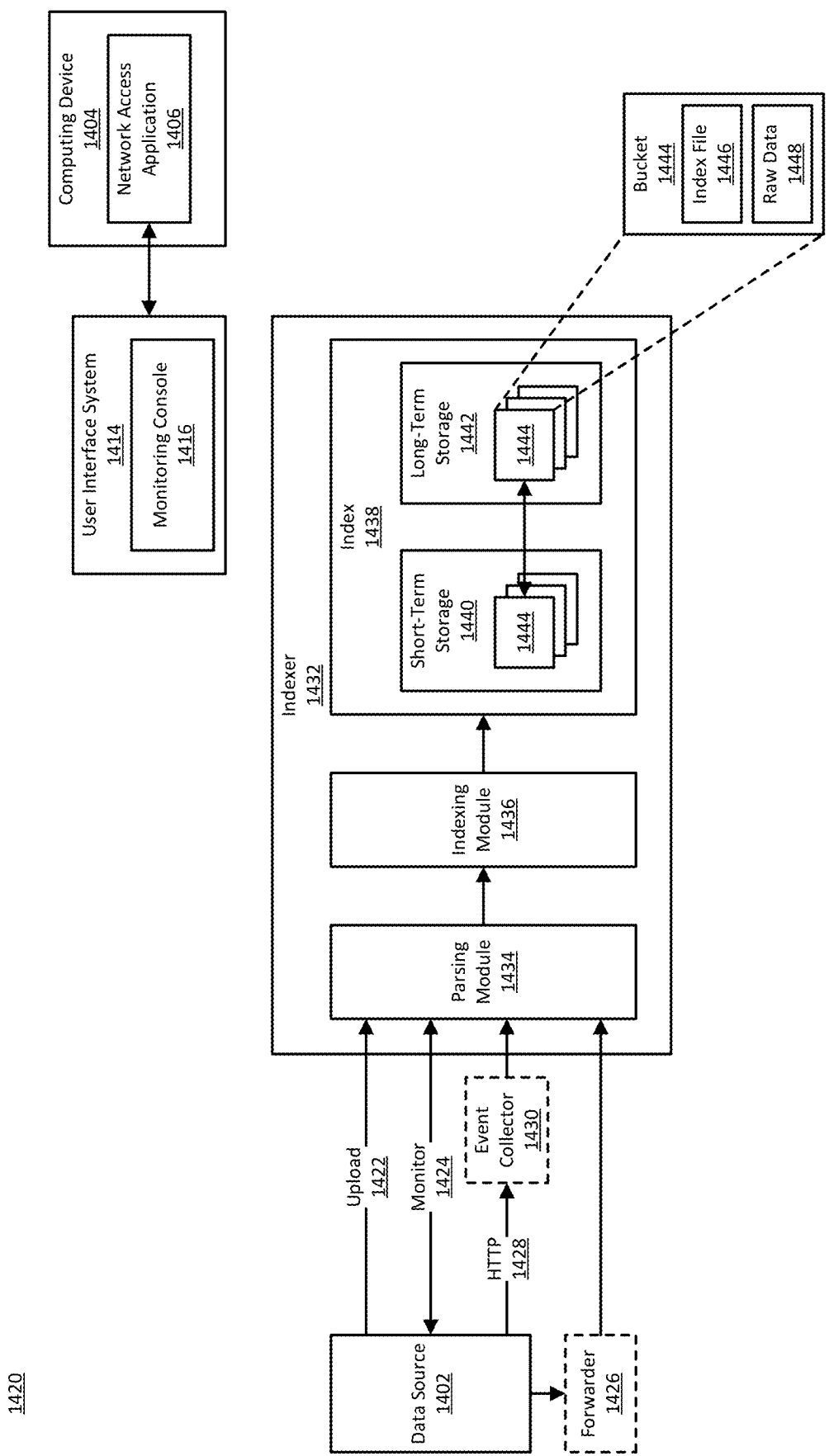
FIG. 14 illustrates an example schematic diagram of data ingest in the data intake and query system in which FIG. 1 may be implemented.

FIG. 14 is a block diagram illustrating in greater detail an example of an indexing system 1420 of a data intake and query system, such as the data intake and query system 1310 of FIG. 13. The indexing system 1420 of FIG. 14 uses various methods to obtain machine data from a data source 1402 and stores the data in an index 1438 of an indexer 1432. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 1420 enables the data intake and query system to obtain the machine data produced by the data source 1402 and to store the data for searching and retrieval.

Users can administer the operations of the indexing system 1420 using a computing device 1404 that can access the indexing system 1420 through a user interface system 1414 of the data intake and query system. For example, the computing device 1404 can be executing a network access application 1406, such as a web browser or a terminal, through which a user can access a monitoring console 1416 provided by the user interface system 1414. The monitoring console 1416 can enable operations such as: identifying the data source 1402 for data ingestion; configuring the indexer 1432 to index the data from the data source 1432; configuring a data ingestion method; configuring, deploying, and managing clusters of indexers; and viewing the topology and performance of a deployment of the data intake and query system, among other operations. The operations performed by the indexing system 1420 may be referred to as "index time" operations, which are distinct from "search time" operations that are discussed further below.

The indexer 1432, which may be referred to herein as a data indexing component, coordinates and performs most of the index time operations. The indexer 1432 can be implemented using program code that can be executed on a computing device. The program code for the indexer 1432 can be stored on a non-transitory computer-readable medium (e.g., a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 1432. In some implementations, the indexer 1432 executes on the computing device 1404 through which a user can access the indexing system 1420. In some implementations, the indexer 1432 executes on a different computing device than the illustrated computing device 1404.

The indexer 1432 may be executing on the computing device that also provides the data source 1402 or may be executing on a different computing device. In implementations wherein the indexer 1432 is on the same computing device as the data source 1402, the data produced by the data source 1402 may be referred to as "local data." In other implementations the data source 1402 is a component of a first computing device and the indexer 1432 executes on a second computing device that is different from the first computing device. In these implementations, the data produced by the data source 1402 may be referred to as "remote data." In some implementations, the first computing device is "on-prem" and in some implementations the first computing device is "in the cloud." In some implementations, the indexer 1432 executes on a computing device in the cloud and the operations of the indexer 1432 are provided as a service to entities that subscribe to the services provided by the data intake and query system.

For a given data produced by the data source 1402, the indexing system 1420 can be configured to use one of several methods to ingest the data into the indexer 1432. These methods include upload 1422, monitor 1424, using a forwarder 1426, or using HyperText Transfer Protocol (HTTP 1428) and an event collector 1430. These and other methods for data ingestion may be referred to as "getting data in" (GDI) methods.

Using the upload 1422 method, a user can specify a file for uploading into the indexer 1432. For example, the monitoring console 1416 can include commands or an interface through which the user can specify where the file is located (e.g., on which computing device and/or in which directory of a file system) and the name of the file. The file may be located at the data source 1402 or maybe on the computing device where the indexer 1432 is executing. Once uploading is initiated, the indexer 1432 processes the file, as discussed further below. Uploading is a manual process and occurs when instigated by a user. For automated data ingestion, the other ingestion methods are used.

The monitor 1424 method enables the indexing system 1402 to monitor the data source 1402 and continuously or periodically obtain data produced by the data source 1402 for ingestion by the indexer 1432. For example, using the monitoring console 1416, a user can specify a file or directory for monitoring. In this example, the indexing system 1402 can execute a monitoring process that detects whenever the file or directory is modified and causes the file or directory contents to be sent to the indexer 1432. As another example, a user can specify a network port for monitoring. In this example, a monitoring process can capture data received at or transmitting from the network port and cause the data to be sent to the indexer 1432. In various examples, monitoring can also be configured for data sources such as operating system event logs, performance data generated by an operating system, operating system registries, operating system directory services, and other data sources.

Monitoring is available when the data source 1402 is local to the indexer 1432 (e.g., the data source 1402 is on the computing device where the indexer 1432 is executing). Other data ingestion methods, including forwarding and the event collector 1430, can be used for either local or remote data sources.

A forwarder 1426, which may be referred to herein as a data forwarding component, is a software process that sends data from the data source 1402 to the indexer 1432. The forwarder 1426 can be implemented using program code that can be executed on the computer device that provides the data source 1402. A user launches the program code for the forwarder 1426 on the computing device that provides the data source 1402. The user can further configure the forwarder 1426, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 1426 can provide various capabilities. For example, the forwarder 1426 can send the data unprocessed or can perform minimal processing on the data before sending the data to the indexer 1432. Minimal processing can include, for example, adding metadata tags to the data to identify a source, source type, and/or host, among other information, dividing the data into blocks, and/or applying a timestamp to the data. In some implementations, the forwarder 1426 can break the data into individual events (event generation is discussed further below) and send the events to a receiver. Other operations that the forwarder 1426 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 1430 provides an alternate method for obtaining data from the data source 1402. The event collector 1430 enables data and application events to be sent to the indexer 1432 using HTTP 1428. The event collector 1430 can be implemented using program code that can be executing on a computing device. The program code may be a component of the data intake and query system or can be a standalone component that can be executed independently of the data intake and query system and operates in cooperation with the data intake and query system.

To use the event collector 1430, a user can, for example using the monitoring console 1416 or a similar interface provided by the user interface system 1414, enable the event collector 1430 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 1402 as an alternative method to using a username and password for authentication.

To send data to the event collector 1430, the data source 1402 is supplied with a token and can then send HTTP 1428 requests to the event collector 1430. To send HTTP 1428 requests, the data source 1402 can be configured to use an HTTP client and/or to use logging libraries such as those supplied by Java, JavaScript, and .NET libraries. An HTTP client enables the data source 1402 to send data to the event collector 1430 by supplying the data, and a Uniform Resource Identifier (URI) for the event collector 1430 to the HTTP client. The HTTP client then handles establishing a connection with the event collector 1430, transmitting a request containing the data, closing the connection, and receiving an acknowledgment if the event collector 1430 sends one. Logging libraries enable HTTP 1428 requests to the event collector 1430 to be generated directly by the data source. For example, an application can include or link a logging library, and through functionality provided by the logging library manage establishing a connection with the event collector 1430, transmitting a request, and receiving an acknowledgement.

An HTTP 1428 request to the event collector 1430 can contain a token, a channel identifier, event metadata, and/or event data. The token authenticates the request with the event collector 1430. The channel identifier, if available in the indexing system 1420, enables the event collector 1430 to segregate and keep separate data from different data sources. The event metadata can include one or more key-value pairs that describe the data source 1402 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 1430 extracts events from HTTP 1428 requests and sends the events to the indexer 1432. The event collector 1430 can further be configured to send events to one or more indexers. Extracting the events can include associating any metadata in a request with the event or events included in the request. In these implementations, event generation by the indexer 1432 (discussed further below) is bypassed, and the indexer

1432 moves the events directly to indexing. In some implementations, the event collector 1430 extracts event data from a request and outputs the event data to the indexer 1432, and the indexer generates events from the event data. In some implementations, the event collector 1430 sends an acknowledgement message to the data source 1402 to indicate that the event collector 1430 has received a particular request form the data source 1402, and/or to indicate to the data source 1402 that events in the request have been added to an index.

The indexer 1432 ingests incoming data and transforms the data into searchable knowledge in the form of events. In the data intake and query system, an event is a single piece of data that represents activity of the component represented in FIG. 14 by the data source 1402. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value, and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 1432 can include a parsing module 1434 and an indexing module 1436 for generating and storing the events. The parsing module 1434 and indexing module 1436 can be modular and pipelined, such that one component can be operating on a first set of data while the second component is simultaneously operating on a second sent of data. Additionally, the indexer 1432 may at any time have multiple instances of the parsing module 1434 and indexing module 1436, with each set of instances configured to simultaneously operate on data from the same data source or from different data sources. The parsing module 1434 and indexing module 1436 are illustrated in FIG. 14 to facilitate discussion, with the understanding that implementations with other components are possible to achieve the same functionality.

The parsing module 1434 determines information about incoming event data, where the information can be used to identify events within the event data. For example, the parsing module 1434 can associate a source type with the event data. A source type identifies the data source 1402 and describes a possible data structure of event data produced by the data source 1402. For example, the source type can indicate which fields to expect in events generated at the data source 1402 and the keys for the values in the fields, and possibly other information such as sizes of fields, an order of the fields, a field separator, and so on. The source type of the data source 1402 can be specified when the data source 1402 is configured as a source of event data. Alternatively, the parsing module 1434 can determine the source type from the event data, for example from an event field in the event data or using machine learning techniques applied to the event data.

Other information that the parsing module 1434 can determine includes timestamps. In some cases, an event includes a timestamp as a field, and the timestamp indicates a point in time when the action represented by the event occurred or was recorded by the data source 1402 as event data. In these cases, the parsing module 1434 may be able to determine from the source type associated with the event data that the timestamps can be extracted from the events themselves. In some cases, an event does not include a timestamp and the parsing module 1434 determines a timestamp for the event, for example from a name associated with the event data from the data source 1402 (e.g., a file name when the event data is in the form of a file) or a time associated with the event data (e.g., a file modification time). As another example, when the parsing module 1434 is not able to determine a timestamp from the event data, the parsing module 1434 may use the time at which it is indexing the event data. As another example, the parsing module 1434 can use a user-configured rule to determine the timestamps to associate with events.

The parsing module 1434 can further determine event boundaries. In some cases, a single line (e.g., a sequence of characters ending with a line termination) in event data represents one event while in other cases, a single line represents multiple events. In yet other cases, one event may span multiple lines within the event data. The parsing module 1434 may be able to determine event boundaries from the source type associated with the event data, for example from a data structure indicated by the source type. In some implementations, a user can configure rules the parsing module 1434 can use to identify event boundaries.

The parsing module 1434 can further extract data from events and possibly also perform transformations on the events. For example, the parsing module 1434 can extract a set of fields (key-value pairs) for each event, such as a host or hostname, source, or source name, and/or source type. The parsing module 1434 may extract certain fields by default or based on a user configuration. Alternatively, or additionally, the parsing module 1434 may add fields to events, such as a source type or a user-configured field. As another example of a transformation, the parsing module 1434 can anonymize fields in events to mask sensitive information, such as social security numbers or account numbers. Anonymizing fields can include changing or replacing values of specific fields. The parsing component 1434 can further perform user-configured transformations.

The parsing module 1434 outputs the results of processing incoming event data to the indexing module 1436, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 1432 can be configured to identify searchable segments that are parts of fields, searchable segments that are entire fields, or both. The parsing module 1434 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 1446, to find event data that matches a search query. In some implementations, segmentation can alternatively be performed by the forwarder 1426. Segmentation can also be disabled, in which case the indexer 1432 will not build a lexicon for the event data. When segmentation is disabled, the search system searches the event data directly.

Building index data structures generates the index 1438. The index 1438 is a storage data structure on a storage device (e.g., a disk drive or other physical device for storing digital data). The storage device may be a component of the computing device on which the indexer 1432 is operating (referred to herein as local storage) or may be a component of a different computing device (referred to herein as remote storage) that the indexer 1438 has access to over a network. The indexer 1432 can manage more than one index and can manage indexes of different types. For example, the indexer 1432 can manage event indexes, which impose minimal structure on stored data and can accommodate any type of data. As another example, the indexer 1432 can manage metrics indexes, which use a highly structured format to handle the higher volume and lower latency demands associated with metrics data.

The indexing module 1436 organizes files in the index 1438 in directories referred to as buckets. The files in a bucket 1444 can include raw data files, index files, and possibly also other metadata files. As used herein, "raw data" means data as when the data was produced by the data source 1402, without alteration to the format or content. As noted previously, the parsing component 1434 may add fields to event data and/or perform transformations on fields in the event data. Event data that has been altered in this way is referred to herein as enriched data. A raw data file 1448 can include enriched data, in addition to or instead of raw data. The raw data file 1448 may be compressed to reduce disk usage. An index file 1446, which may also be referred to herein as a "time-series index" or tsidx file, contains metadata that the indexer 1432 can use to search a corresponding raw data file 1448. As noted above, the metadata in the index file 1446 includes a lexicon of the event data, which associates each unique keyword in the event data with a reference to the location of event data within the raw data file 1448. The keyword data in the index file 1446 may also be referred to as an inverted index. In various implementations, the data intake and query system can use index files for other purposes, such as to store data summarizations that can be used to accelerate searches.

A bucket 1444 includes event data for a particular range of time. The indexing module 1436 arranges buckets in the index 1438 according to the age of the buckets, such that buckets for more recent ranges of time are stored in short-term storage 1440 and buckets for less recent ranges of time are stored in long-term storage 1442. Short-term storage 1440 may be faster to access while long-term storage 1442 may be slower to access. Buckets may be moves from short-term storage 1440 to long-term storage 1442 according to a configurable data retention policy, which can indicate at what point in time a bucket is old enough to be moved.

A bucket's location in short-term storage 1440 or long-term storage 1442 can also be indicated by the bucket's status. As an example, a bucket's status can be "hot," "warm," "cold," "frozen," or "thawed." In this example, hot bucket is one to which the indexer 1432 is writing data and the bucket becomes a warm bucket when the index 1432 stops writing data to it. In this example, both hot and warm buckets reside in short-term storage 1440. Continuing this example, when a warm bucket is moved to long-term storage 1442, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 1420 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each bucket must exist within the cluster), and indexers to which buckets are copied may be selected to optimize distribution of data across the cluster.

A user can view the performance of the indexing system 1420 through the monitoring console 1416 provided by the user interface system 1414. Using the monitoring console 1416, the user can configure and monitor an index cluster, and see information such as disk usage by an index, volume usage by an indexer, index and volume size over time, data age, statistics for bucket types, and bucket settings, among other information.

Figure 15:
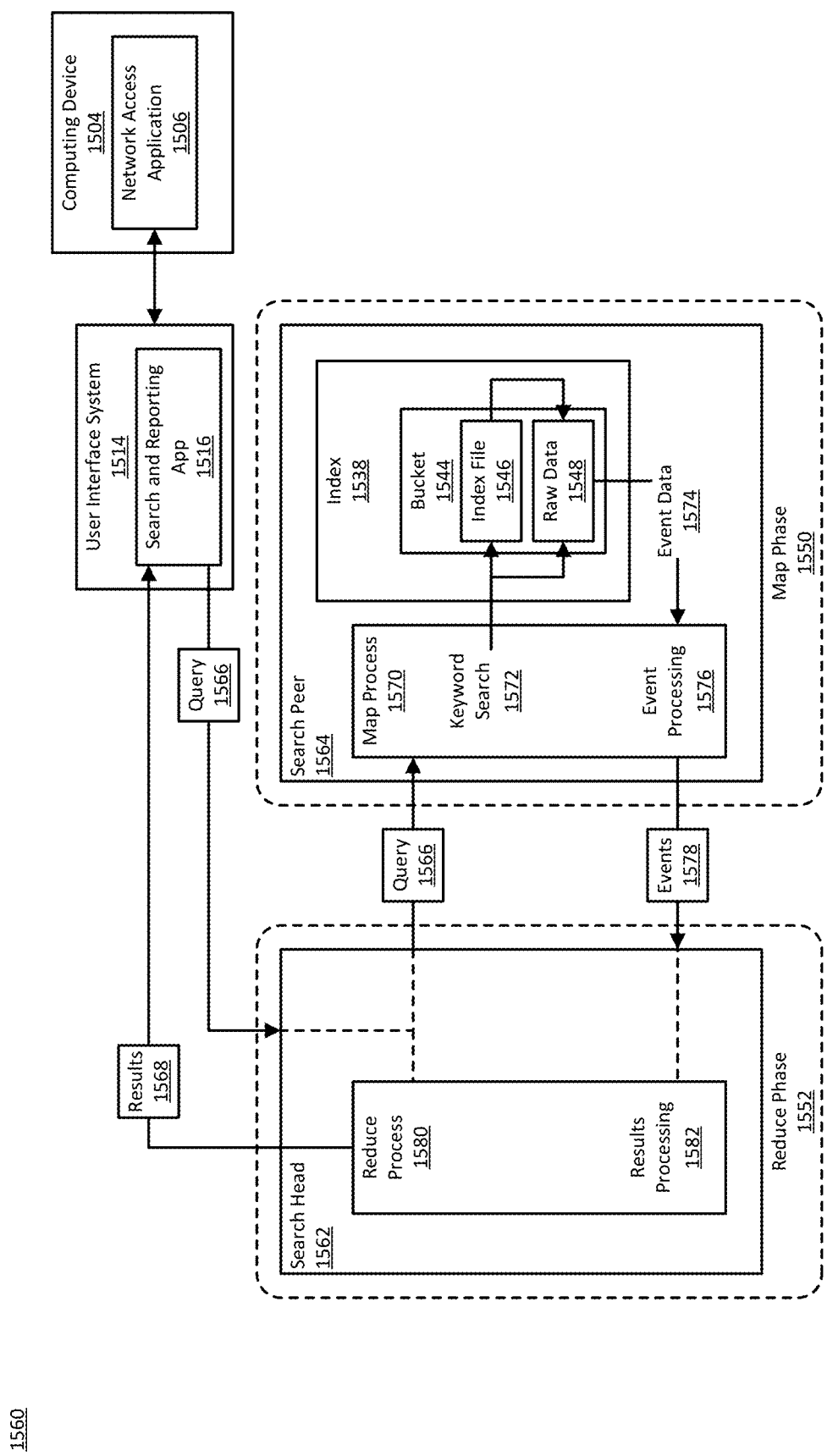
FIG. 15 illustrates an example schematic diagram of search in the data intake and query system in which FIG. 1 may be implemented.

FIG. 15 is a block diagram illustrating in greater detail an example of the search system 1560 of a data intake and query system, such as the data intake and query system 1310 of FIG. 13. The search system 1560 of FIG. 15 issues a query 1566 to a search head 1562, which sends the query 1566 to a search peer 1564. Using a map process 1570, the search peer 1564 searches the appropriate index 1538 for events identified by the query 1566 and sends events 1578 so identified back to the search head 1562. Using a reduce process 1582, the search head 1562 processes the events 1578 and produces results 1568 to respond to the query 1566. The results 1568 can provide useful insights about the data stored in the index 1538. These insights can aid in the administration of information technology systems, in security analysis of information technology systems, and/or in analysis of the development environment provided by information technology systems.

The query 1566 that initiates a search is produced by a search and reporting app 1516 that is available through the user interface system 1514 of the data intake and query system. Using a network access application 1506 executing on a computing device 1504, a user can input the query 1566 into a search field provided by the search and reporting app 1516. Alternatively, or additionally, the search and reporting app 1516 can include pre-configured queries or stored queries that can be activated by the user. In some cases, the search and reporting app 1516 initiates the query 1566 when the user enters the query 1566. In these cases, the query 1566 maybe referred to as an "ad-hoc" query. In some cases, the search and reporting app 1516 initiates the query 1566 based on a schedule. For example, the search and reporting app 1516 can be configured to execute the query 1566 once per hour, once per day, at a specific time, on a specific date, or at some other time that can be specified by a date, time, and/or frequency. These types of queries maybe referred to as scheduled queries.

The query 1566 is specified using a search processing language. The search processing language includes commands or search terms that the search peer 1564 will use to identify events to return in the search results 1568. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 1566 to include sequential commands, where a subsequent command may operate on the results of a prior command. As an example, sequential commands may be separated in the query 1566 by a vertical line ("|" or "pipe") symbol.

In addition to one or more search commands, the query 1566 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 1566 occurs in two broad phases: a map phase 1550 and a reduce phase 1552. The map phase 1550 takes place across one or more search peers. In the map phase 1550, the search peers locate event data that matches the search terms in the search query 1566 and sorts the event data into field-value pairs. When the map phase 1550 is complete, the search peers send events that they have found to one or more search heads for the reduce phase 1552. During the reduce phase 1552, the search heads process the events through commands in the search query 1566 and aggregate the events to produce the final search results 1568.

A search head, such as the search head 1562 illustrated in FIG. 15, is a component of the search system 1560 that manages searches. The search head 1562, which may also be referred to herein as a search management component, can be implemented using program code that can be executed on a computing device. The program code for the search head 1562 can be stored on a non-transitory computer-readable medium and from this medium can be loaded or copied to the memory of a computing device. One or more hardware processors of the computing device can read the program code from the memory and execute the program code in order to implement the operations of the search head 1562.

Upon receiving the search query 1566, the search head 1562 directs the query 1566 to one or more search peers, such as the search peer 1564 illustrated in FIG. 15. "Search peer" is an alternate name for "indexer" and a search peer may be largely similar to the indexer described previously. The search peer 1564 may be referred to as a "peer node" when the search peer 1564 is part of an indexer cluster. The search peer 1564, which may also be referred to as a search execution component, can be implemented using program code that can be executed on a computing device. In some implementations, one set of program code implements both the search head 1562 and the search peer 1564 such that the search head 1562 and the search peer 1564 form one component. In some implementations, the search head 1562 is an independent piece of code that performs searching and no indexing functionality. In these implementations, the search head 1562 may be referred to as a dedicated search head.

The search head 1562 may consider multiple criteria when determining whether to send the query 1566 to the particular search peer 1564. For example, the search system 1560 may be configured to include multiple search peers that each have duplicative copies of at least some of the event data and are implanted using different hardware resources q. In this example, the sending the search query 1566 to more than one search peer allows the search system 1560 to distribute the search workload across different hardware resources. As another example, search system 1560 may include different search peers for different purposes (e.g., one has an index storing a first type of data or from a first data source while a second has an index storing a second type of data or from a second data source). In this example, the search query 1566 may specify which indexes to search, and the search head 1562 will send the query 1566 to the search peers that have those indexes.

To identify events 1578 to send back to the search head 1562, the search peer 1564 performs a map process 1570 to obtain event data 1574 from the index 1538 that is maintained by the search peer 1564. During a first phase of the map process 1570, the search peer 1564 identifies buckets that have events that are described by the time indicator in the search query 1566. As noted above, a bucket contains events whose timestamps fall within a particular range of time. For each bucket 1544 whose events can be described by the time indicator, during a second phase of the map process 1570, the search peer 1564 performs a keyword search 1574 using search terms specified in the search query #A66. The search terms can be one or more of keywords, phrases, fields, Boolean expressions, and/or comparison expressions that in combination describe events being searched for. When segmentation is enabled at index time, the search peer 1564 performs the keyword search 1572 on the bucket's index file 1546. As noted previously, the index file 1546 includes a lexicon of the searchable terms in the events stored in the bucket's raw data 1548 file. The keyword search 1572 searches the lexicon for searchable terms that correspond to one or more of the search terms in the query 1566. As also noted above, the lexicon incudes, for each searchable term, a reference to each location in the raw data 1548 file where the searchable term can be found. Thus, when the keyword search identifies a searchable term in the index file 1546 that matches a search term in the query 1566, the search peer 1564 can use the location references to extract from the raw data 1548 file the event data 1574 for each event that include the searchable term.

In cases where segmentation was disabled at index time, the search peer 1564 performs the keyword search 1572 directly on the raw data 1548 file. To search the raw data 1548, the search peer 1564 may identify searchable segments in events in a similar manner as when the data was indexed. Thus, depending on how the search peer 1564 is configured, the search peer 1564 may look at event fields and/or parts of event fields to determine whether an event matches the query 1566. Any matching events can be added to the event data #A74 read from the raw data 1548 file. The search peer 1564 can further be configured to enable segmentation at search time, so that searching of the index 1538 causes the search peer 1564 to build a lexicon in the index file 1546.

The event data 1574 obtained from the raw data 1548 file includes the full text of each event found by the keyword search 1572. During a third phase of the map process 1570, the search peer 1564 performs event processing 1576 on the event data 1574, with the steps performed being determined by the configuration of the search peer 1564 and/or commands in the search query 1566. For example, the search peer 1564 can be configured to perform field discovery and field extraction. Field discovery is a process by which the search peer 1564 identifies and extracts key-value pairs from the events in the event data 1574. The search peer 1564 can, for example, be configured to automatically extract the first 100 fields (or another number of fields) in the event data 1574 that can be identified as key-value pairs. As another example, the search peer 1564 can extract any fields explicitly mentioned in the search query 1566. The search peer 1564 can, alternatively or additionally, be configured with particular field extractions to perform.

Other examples of steps that can be performed during event processing 1576 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 1564 sends processed events 1578 to the search head 1562, which performs a reduce process 1580. The reduce process 1580 potentially receives events from multiple search peers and performs various results processing 1582 steps on the received events. The results processing 1582 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 1582 can further include applying commands from the search query 1566 to the events. The query 1566 can include, for example, commands for evaluating and/or manipulating fields (e.g., to generate new fields from existing fields or parse fields that have more than one value). As another example, the query 1566 can include commands for calculating statistics over the events, such as counts of the occurrences of fields, or sums, averages, ranges, and so on, of field values. As another example, the query 1566 can include commands for generating statistical values for purposes of generating charts of graphs of the events.

The reduce process 1580 outputs the events found by the search query 1566, as well as information about the events. The search head 1562 transmits the events and the information about the events as search results 1568, which are received by the search and reporting app 1516. The search and reporting app 1516 can generate visual interfaces for viewing the search results 1568. The search and reporting app 1516 can, for example, output visual interfaces for the network access application 1506 running on a computing device 1504 to generate.

The visual interfaces can include various visualizations of the search results 1568, such as tables, line or area charts, Chloropleth maps, or single values. The search and reporting app 1516 can organize the visualizations into a dashboard, where the dashboard includes a panel for each visualization. A dashboard can thus include, for example, a panel listing the raw event data for the events in the search results 1568, a panel listing fields extracted at index time and/or found through field discovery along with statistics for those fields, and/or a timeline chart indicating how many events occurred at specific points in time (as indicated by the timestamps associated with each event). In various implementations, the search and reporting app 1516 can provide one or more default dashboards. Alternatively, or additionally, the search and reporting app 1516 can include functionality that enables a user to configure custom dashboards.

The search and reporting app 1516 can also enable further investigation into the events in the search results 1516. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 1566. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 16:
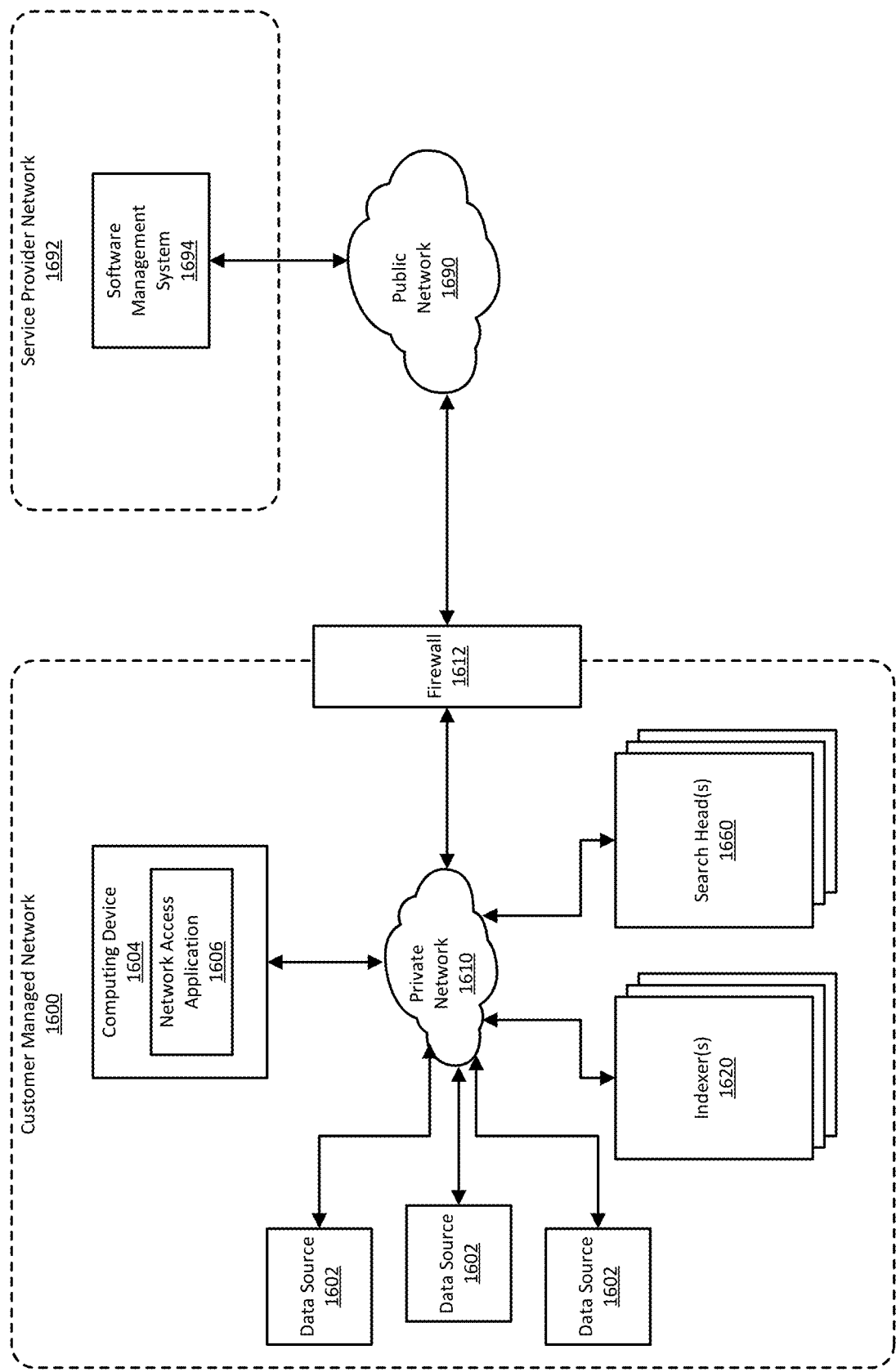
FIG. 16 illustrates an example diagram of an on premises data intake and query system in which FIG. 1 may be implemented.

FIG. 16 illustrates an example of a self-managed network 1600 that includes a data intake and query system. "Self-managed" in this instance means that the entity that is operating the self-managed network 1600 configures, administers, maintains, and/or operates the data intake and query system using its own compute resources and people. Further, the self-managed network 1600 of this example is part of the entity's on-premise network and comprises a set of compute, memory, and networking resources that are located, for example, within the confines of an entity's data center. These resources can include software and hardware resources. The entity can, for example, be a company or enterprise, a school, government entity, or other entity. Since the self-managed network 1600 is located within the customer's on-prem environment, such as in the entity's data center, the operation and management of the self-managed network 1600, including of the resources in the self-managed network 1600, is under the control of the entity. For example, administrative personnel of the entity have complete access to and control over the configuration, management, and security of the self-managed network 1600 and its resources.

The self-managed network 1600 can execute one or more instances of the data intake and query system. An instance of the data intake and query system may be executed by one or more computing devices that are part of the self-managed network 1600. A data intake and query system instance can comprise an indexing system and a search system, where the indexing system includes one or more indexers 1620 and the search system includes one or more search heads 1660.

As depicted in FIG. 16, the self-managed network 1600 can include one or more data sources 1602. Data received from these data sources may be processed by an instance of the data intake and query system within self-managed network 1600. The data sources 1602 and the data intake and query system instance can be communicatively coupled to each other via a private network 1610.

Users associated with the entity can interact with and avail themselves of the functions performed by a data intake and query system instance using computing devices. As depicted in FIG. 16, a computing device 1604 can execute a network access application 1606 (e.g., a web browser), that can communicate with the data intake and query system instance and with data sources 1602 via the private network 1610. Using the computing device 1604, a user can perform various operations with respect to the data intake and query system, such as management and administration of the data intake and query system, generation of knowledge objects, and other functions. Results generated from processing performed by the data intake and query system instance may be communicated to the computing device 1604 and output to the user via an output system (e.g., a screen) of the computing device 1604.

The self-managed network 1600 can also be connected to other networks that are outside the entity's on-premise environment/network, such as networks outside the entity's data center. Connectivity to these other external networks is controlled and regulated through one or more layers of security provided by the self-managed network 1600. One or more of these security layers can be implemented using firewalls 1612. The firewalls 1612 form a layer of security around the self-managed network 1600 and regulate the transmission of traffic from the self-managed network 1600 to the other networks and from these other networks to the self-managed network 1600.

Networks external to the self-managed network can include various types of networks including public networks 1690, other private networks, and/or cloud networks provided by one or more cloud service providers. An example of a public network 1690 is the Internet. In the example depicted in FIG. 16, the self-managed network 1600 is connected to a service provider network 1692 provided by a cloud service provider via the public network 1690.

In some implementations, resources provided by a cloud service provider may be used to facilitate the configuration and management of resources within the self-managed network 1600. For example, configuration and management of a data intake and query system instance in the self-managed network 1600 may be facilitated by a software management system 1694 operating in the service provider network 1692. There are various ways in which the software management system 1694 can facilitate the configuration and management of a data intake and query system instance within the self-managed network 1600. As one example, the software management system 1694 may facilitate the download of software including software updates for the data intake and query system. In this example, the software management system 1694 may store information indicative of the versions of the various data intake and query system instances present in the self-managed network 1600. When a software patch or upgrade is available for an instance, the software management system 1694 may inform the self-managed network 1600 of the patch or upgrade. This can be done via messages communicated from the software management system 1694 to the self-managed network 1600.

The software management system 1694 may also provide simplified ways for the patches and/or upgrades to be downloaded and applied to the self-managed network 1600. For example, a message communicated from the software management system 1694 to the self-managed network 1600 regarding a software upgrade may include a Uniform Resource Identifier (URI) that can be used by a system administrator of the self-managed network 1600 to download the upgrade to the self-managed network 1600. In this manner, management resources provided by a cloud service provider using the service provider network 1692 and which are located outside the self-managed network 1600 can be used to facilitate the configuration and management of one or more resources within the entity's on-prem environment. In some implementations, the download of the upgrades and patches may be automated, whereby the software management system 1694 is authorized to, upon determining that a patch is applicable to a data intake and query system instance inside the self-managed network 1600, automatically communicate the upgrade or patch to self-managed network 1600 and cause it to be installed within self-managed network 1600.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method, comprising:
    receiving a dashboard code defining a dashboard comprising a plurality of visualizations in a layout;
    rendering, in a graphical user interface (GUI) of a dashboard editing tool, the dashboard based on the dashboard code;
    extracting, using the dashboard code, a data attribute of a data object represented by a first visualization of the plurality of visualizations;
    evaluating, by the dashboard editing tool, the first visualization based on the data attribute to obtain a score;
    presenting, in the GUI of the dashboard editing tool, a first recommendation based on the score failing to satisfy a first threshold;
    receiving, through the GUI of the dashboard editing tool and after presenting the first recommendation, an edit to the dashboard code that adjusts the first visualization; and
    storing, by the dashboard editing tool, the edit to the dashboard code.

2. The computer implemented method of claim 1, further comprising:
    extracting, from the dashboard code, a plurality of raw attribute values of a second visualization of the plurality of visualizations;
    calculating, from the plurality of raw attribute values, a visual property value of the second visualization;
    determining that the visual property value fails to satisfy a second threshold;
    presenting, in the GUI of the dashboard editing tool, a second recommendation based on the visual property value failing to satisfy the second threshold.

3. The computer implemented method of claim 1, further comprising:
    extracting, from the dashboard code, a first color value of a first color in a second visualization of the plurality of visualizations;
    extracting, from the dashboard code, a second color value of a second color in a second visualization of the plurality of visualizations;
    calculating a color contrast ratio of the first color and the second color;
    determining that the color contrast ratio fails to satisfy a second threshold;
    presenting, in the GUI of the dashboard editing tool, a second recommendation to adjust at least one of the first color value and the second color value based on the color contrast ratio failing to satisfy the second threshold.

4. The computer implemented method of claim 1, further comprising:
    extracting, from the dashboard code, a first color value of a first color in a second visualization of the plurality of visualizations;
    extracting, from the dashboard code, a second color value of a second color in a second visualization of the plurality of visualizations;
    mapping the first color value to a first mapped value;
    mapping the second color value to a second mapped value;
    calculating a color contrast ratio of the first mapped value to the second mapped value;
    determining that the color contrast ratio fails to satisfy a second threshold;
    presenting, in the GUI of the dashboard editing tool, a second recommendation to adjust at least one of the first color value and the second color value based on the color contrast ratio failing to satisfy the second threshold.

5. The computer implemented method of claim 1, further comprising:
    executing a query defined in the dashboard code;
    querying a data intake and query system for a data sample of the data object; and
    extracting the data attribute from the data sample.

6. The computer implemented method of claim 1, further comprising:
    receiving a selection of a GUI widget in the dashboard editing tool;
    identifying a subset of the plurality of visualizations based on failing to satisfy respective threshold; and
    presenting, responsive to the subset failing to satisfy the respective threshold, an indicator for each visualization in the subset in the GUI of the dashboard editing tool.

7. The computer implemented method of claim 1, further comprising:
    receiving a selection of a GUI widget in the dashboard editing tool; and
    presenting a popup box in the GUI of the dashboard editing tool, the popup box comprising the first recommendation.

8. The computer implemented method of claim 1, further comprising:
    determining, based on the data attribute, that a visualization type of the first visualization fails to match a data type of data object; and
    generating the first recommendation to suggest a change in the visualization type of the first visualization.

9. The computer implemented method of claim 1, further comprising:
    analyzing, by the dashboard editing tool, a layout of the plurality of visualizations in the dashboard; and
    generating the recommendation to suggest a change in the layout.

10. The computer implemented method of claim 1, further comprising:
    analyzing, by the dashboard editing tool, a layout of the plurality of visualizations in the dashboard;
    determining that a density of the layout fails to satisfy a second threshold; and
    generating a second recommendation to suggest a change in the layout based on the density of the layout.

11. The computer implemented method of claim 1, further comprising:
    determining a shape of the data in the data object from the data attribute;
    determining that the shape of the data fails to match a visualization attribute of the first visualization; and
    generating the recommendation to change the visualization attribute of the first visualization.

12. A computing device, comprising:
a processor; and
a non-transitory computer-readable medium having stored thereon instructions that, when executed by the processor, cause the processor to perform operations including:
  receiving a dashboard code defining a dashboard comprising a plurality of visualizations in a layout,
  rendering, in a graphical user interface (GUI) of a dashboard editing tool, the dashboard based on the dashboard code,
  extracting, using the dashboard code, a data attribute of a data object represented by a first visualization of the plurality of visualizations,
  evaluating, by the dashboard editing tool, the first visualization based on the data attribute to obtain a score,
  presenting, in the GUI of the dashboard editing tool, a first recommendation based on the score failing to satisfy a first threshold,
  receiving, through the GUI of the dashboard editing tool and after presenting the first recommendation, an edit to the dashboard code that adjusts the first visualization, and
  storing, by the dashboard editing tool, the edit to the dashboard code.

13. The computing device of claim 12, the operations further comprising:
  extracting, from the dashboard code, a plurality of raw attribute values of a second visualization of the plurality of visualizations;
  calculating, from the plurality of raw attribute values, a visual property value of the second visualization;
  determining that the visual property value fails to satisfy a second threshold;
  presenting, in the GUI of the dashboard editing tool, a second recommendation based on the visual property value failing to satisfy the second threshold.

14. The computing device of claim 12, the operations further comprising:
  extracting, from the dashboard code, a first color value of a first color in a second visualization of the plurality of visualizations;
  extracting, from the dashboard code, a second color value of a second color in a second visualization of the plurality of visualizations;
  calculating a color contrast ratio of the first color and the second color;
  determining that the color contrast ratio fails to satisfy a second threshold;
  presenting, in the GUI of the dashboard editing tool, a second recommendation to adjust at least one of the first color value and the second color value based on the color contrast ratio failing to satisfy the second threshold.

15. The computing device of claim 12, the operations further comprising:
  extracting, from the dashboard code, a first color value of a first color in a second visualization of the plurality of visualizations;
  extracting, from the dashboard code, a second color value of a second color in a second visualization of the plurality of visualizations;
  mapping the first color value to a first mapped value;
  mapping the second color value to a second mapped value;
  calculating a color contrast ratio of the first mapped value to the second mapped value;
  determining that the color contrast ratio fails to satisfy a second threshold;
  presenting, in the GUI of the dashboard editing tool, a second recommendation to adjust at least one of the first color value and the second color value based on the color contrast ratio failing to satisfy the second threshold.

16. The computing device of claim 12, the operations further comprising:
  executing a query defined in the dashboard code;
  querying a data intake and query system for a data sample of the data object; and
  extracting the data attribute from the data sample.

17. The computing device of claim 12, the operations further comprising:
  receiving a selection of a GUI widget in the dashboard editing tool;
  identifying a subset of the plurality of visualizations based on failing to satisfy respective threshold; and
  presenting, responsive to the subset failing to satisfy the respective threshold, an indicator for each visualization in the subset in the GUI of the dashboard editing tool.

18. The computing device of claim 12, the operations further comprising:
  receiving a selection of a GUI widget in the dashboard editing tool; and
  presenting a popup box in the GUI of the dashboard editing tool, the popup box comprising the first recommendation.

19. A non-transitory computer-readable medium having stored thereon instructions that, when executed by one or more processors, cause the one or more processor to perform operations including:
  receiving a dashboard code defining a dashboard comprising a plurality of visualizations in a layout;
  rendering, in a graphical user interface (GUI) of a dashboard editing tool, the dashboard based on the dashboard code;
  extracting, using the dashboard code, a data attribute of a data object represented by a first visualization of the plurality of visualizations;
  evaluating, by the dashboard editing tool, the first visualization based on the data attribute to obtain a score;
  presenting, in the GUI of the dashboard editing tool, a first recommendation based on the score failing to satisfy a first threshold;
  receiving, through the GUI of the dashboard editing tool and after presenting the first recommendation, an edit to the dashboard code that adjusts the first visualization;
  storing, by the dashboard editing tool, the edit to the dashboard code.

20. The non-transitory computer-readable medium of claim 19, the operations further comprising:
  extracting, from the dashboard code, a plurality of raw attribute values of a second visualization of the plurality of visualizations;
  calculating, from the plurality of raw attribute values, a visual property value of the second visualization;
  determining that the visual property value fails to satisfy a second threshold;
  presenting, in the GUI of the dashboard editing tool, a second recommendation based on the visual property value failing to satisfy the second threshold.

* * * * *